United States Patent
Liu et al.

(10) Patent No.: US 11,206,662 B2
(45) Date of Patent: Dec. 21, 2021

(54) METHOD AND DEVICE IN NODE FOR WIRELESS COMMUNICATION

(71) Applicants: Zheng Liu, Shanghai (CN); XiaoBo Zhang, Shanghai (CN); Lin Yang, Shanghai (CN)

(72) Inventors: Zheng Liu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 104 days.

(21) Appl. No.: 16/713,007

(22) Filed: Dec. 13, 2019

(65) Prior Publication Data
US 2020/0196293 A1    Jun. 18, 2020

(51) Int. Cl.
| | |
|---|---|
| H04W 72/04 | (2009.01) |
| H04W 4/40 | (2018.01) |
| H04L 5/00 | (2006.01) |
| H04W 72/02 | (2009.01) |
| H04W 92/18 | (2009.01) |

(52) U.S. Cl.
CPC ......... *H04W 72/044* (2013.01); *H04L 5/0007* (2013.01); *H04L 5/0055* (2013.01); *H04W 4/40* (2018.02); *H04W 72/02* (2013.01); *H04W 92/18* (2013.01)

(58) Field of Classification Search
CPC ..... H04W 72/044; H04W 4/40; H04W 72/02; H04W 92/18; H04L 5/0007; H04L 5/0055
See application file for complete search history.

(56) References Cited

U.S. PATENT DOCUMENTS

| | | | | |
|---|---|---|---|---|
| 11,012,203 | B2* | 5/2021 | Zhang | H04B 7/0691 |
| 2019/0075548 | A1* | 3/2019 | Lee | H04W 72/044 |
| 2020/0029245 | A1* | 1/2020 | Khoryaev | H04W 4/46 |
| 2020/0029318 | A1* | 1/2020 | Guo | H04W 4/40 |
| 2020/0037343 | A1* | 1/2020 | He | H04W 72/1263 |
| 2020/0045715 | A1* | 2/2020 | Li | H04W 72/1263 |
| 2020/0106566 | A1* | 4/2020 | Yeo | H04W 28/04 |
| 2020/0112982 | A1* | 4/2020 | Li | H04L 5/0082 |
| 2020/0145867 | A1* | 5/2020 | Tseng | H04W 76/14 |
| 2020/0187252 | A1* | 6/2020 | Lee | H04W 24/10 |
| 2020/0220694 | A1* | 7/2020 | Khoryaev | H04W 28/04 |

(Continued)

*Primary Examiner* — Michael J Moore, Jr.

(57) ABSTRACT

The disclosure provides a method and a device in a communication node for wireless communication. The communication node performs signaling monitoring in a first time window, X1 signaling(s) being detected in the signaling monitoring process, determines Y1 candidate resource set(s) from a first candidate resource pool, transmits a first signaling, and receives first feedback information in a target resource set, the target resource set being one of the Y1 candidate resource set(s); the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s); and the first signaling is used for indicating the target resource set. The disclosure avoids or reduces feedback collision.

20 Claims, 12 Drawing Sheets

(56) References Cited

U.S. PATENT DOCUMENTS

| | | | |
|---|---|---|---|
| 2020/0296690 A1* | 9/2020 | Lee | H04W 4/40 |
| 2020/0313825 A1* | 10/2020 | Ryu | H04L 5/0051 |
| 2021/0014831 A1* | 1/2021 | Ryu | H04W 76/11 |
| 2021/0051630 A1* | 2/2021 | Chae | H04W 72/0453 |
| 2021/0058905 A1* | 2/2021 | Ganesan | H04L 5/0014 |
| 2021/0099269 A1* | 4/2021 | Wu | H04L 27/2602 |
| 2021/0099974 A1* | 4/2021 | Wu | H04W 8/24 |
| 2021/0127364 A1* | 4/2021 | Panteleev | H04W 72/02 |
| 2021/0127365 A1* | 4/2021 | Wang | H04B 7/04 |
| 2021/0144736 A1* | 5/2021 | Li | H04W 72/1263 |

\* cited by examiner

METHOD AND DEVICE IN NODE FOR WIRELESS COMMUNICATION

CROSS-REFERENCE TO RELATED APPLICATION

This application claims the priority benefit of Chinese Patent Application Serial Number 201811526961.0, filed on Dec. 13, 2018, the full disclosure of which is incorporated herein by reference.

BACKGROUND

Technical Field

The disclosure relates to transmission methods and devices in wireless communication systems, and in particular to a transmission method and device for information feedback in wireless communication.

Related Art

Application scenarios of future wireless communication systems are becoming increasingly diversified, and different application scenarios have different performance requirements on systems. In order to meet different performance requirements of various application scenarios, the 3rd Generation Partner Project (3GPP) Radio Access Network (RAN) #72 plenary session decided to conduct the study of New Radio (NR). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platooning, Extended Sensors, Advanced Driving and Remote Driving. The Study Item (SI) of technical research of NR V2X was approved at the 3GPP RAN #80 session.

SUMMARY

Compared with LTE V2X systems, NR V2X has a significant feature that it can support multicast and unicast and support Hybrid Automatic Repeat Request (HARQ) functions. The 3GPP RANI #95 session agreed to introduce one independent Physical Sidelink Feedback Channel (PSFCH) for sidelink. The PSFCH is used for carrying HARQ feedback information, and it is likely to carry Channel Status Information (CSI) feedback information. Furthermore, NR V2X supports a UE to autonomously select a mode of transmission resources and a corresponding mechanism of avoiding or reducing collision. The design of PSFCH needs a solution.

In view of the problems about the design of PSFCH in NR V2X, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a first communication node for wireless communication, wherein the method includes:

performing signaling monitoring in a first time window, X1 signaling(s) being detected in the signaling monitoring process and the X1 being a non-negative integer;

determining Y1 candidate resource set(s) from a first candidate resource pool, the Y1 being a positive integer;

transmitting a first signaling; and receiving first feedback information in a target resource set, the target resource set being one of the Y1 candidate resource set(s).

Herein, the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the Y2 candidate resource set(s) in the first candidate resource pool is(are) excluded from the resources used for receiving the first feedback information, which can avoid or effectively reduce the occurrence of collision or conflict when feedback information is transmitted, thereby improving efficiency of transmission.

In one embodiment, in order to avoid or reduce collision, transmission resources for the first feedback information are determined through monitoring X1 signaling(s), thus resource information of other nodes used for transmitting feedback information can be acquired effectively; the standard work is simplified while the validity of collision detection is guaranteed.

According to one aspect of the disclosure, the above method is characterized in that: the first candidate resource pool includes Y candidate resource set(s), any one of the Y1 candidate resource set(s) belongs to one of the Y candidate resource set(s), any one of the Y2 candidate resource set(s) belongs to one of the Y candidate resource set(s), and the Y is an integer not less than a summation of the Y1 and the Y2; and time-frequency resources occupied by the first signaling are used for determining the first candidate resource pool.

According to one aspect of the disclosure, the above method is characterized in that: a time length of a time interval between a start of the first time window and a start of receiving the first feedback information is related to a reference time length; and the reference time length is equal to an upper bound of a time interval length between a start of transmitting the first signaling and a start of receiving the first feedback information.

According to one aspect of the disclosure, the above method is characterized in that: the X1 is greater than 1, the X1 signalings include a second signaling, the second signaling indicates the target resource set, the X1 signalings indicate X1 integers respectively, and an integer among the X1 integers indicated by the second signaling is a first integer; an integer among the X1 integers other than the first integer is not greater than the first integer, or, an integer among the X1 integers other than the first integer is not less than the first integer.

In one embodiment, when feedback resources are limited, resources for feedback bundling are determined according to priority or QoS level information represented by the X1 integers, which can guarantee the accurate transmission and timely transmission of high-priority feedback information.

According to one aspect of the disclosure, the above method is characterized in that: the signaling monitoring is performed only when a time length of the first time window is not less than a first threshold; the first threshold is predefined, or the first threshold is configured; and when the X1 is equal to 0, the Y2 is equal to 0.

According to one aspect of the disclosure, the above method further includes:

transmitting a first radio signal.

Herein, the first signaling is used for indicating at least one of time-frequency resources occupied by the first radio signal, a Modulation and Coding Scheme (MCS) employed by the first radio signal or a Redundancy Version (RV) employed by the first radio signal; the first feedback information is used for determining whether the first radio signal is correctly received; and the first radio signal is transmitted via the air interface.

According to one aspect of the disclosure, the above method is characterized in that: time-frequency resources occupied by the first signaling belong to a first control resource set, the first control resource set belongs to a first control resource pool, the Y2 candidate resource set(s) is(are) one-to-one corresponding to Y2 control resource set(s), and the first control resource set is one control resource set in the first control resource pool other than the Y2 control resource set(s).

According to one aspect of the disclosure, the above method is characterized in that: time-frequency resources occupied by the first radio signal belong to a first data resource set, the first data resource set belongs to a first data resource pool, the Y2 candidate resource set(s) is(are) one-to-one corresponding to Y2 data resource set(s), and the first data resource set is one data resource set in the first data resource pool other than the Y2 data resource set(s).

The disclosure provides a method in a second communication node for wireless communication, wherein the method includes:

receiving X1 signaling(s) in a first time window, the X1 being a positive integer;

determining Y1 candidate resource set(s) from a first candidate resource pool, the Y1 being a positive integer;

receiving a first signaling; and transmitting first feedback information in a target resource set, the target resource set being one of the Y1 candidate resource set(s).

Herein, the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

According to one aspect of the disclosure, the above method further includes:

receiving a first radio signal.

Herein, the first signaling is used for indicating at least one of time-frequency resources occupied by the first radio signal, an MCS employed by the first radio signal or an RV employed by the first radio signal; the first feedback information is used for determining whether the first radio signal is correctly received; and the first radio signal is transmitted via the air interface.

According to one aspect of the disclosure, the above method is characterized in that: the X1 signalings include a second signaling, the second signaling indicates the target resource set, and the X1 signalings indicate X1 integers respectively; an integer among the X1 integers indicated by the second signaling is not greater than any one of the X1 integers, or, an integer among the X1 integers indicated by the second signaling is not less than any one of the X1 integers; the first feedback information is a bundling of a feedback for one radio signal scheduled by the first signaling and a feedback for one radio signal scheduled by the second signaling.

In one embodiment, when feedbacks for different UEs collide or share same feedback resources, the method of feedback bundling may avoid loss of packets due to error feedback, thus improving robustness of transmission.

The disclosure provides a first communication node for wireless communication, wherein the first communication node includes:

a first receiver, to perform signaling monitoring in a first time window, X1 signaling(s) being detected in the signaling monitoring process and the X1 being a non-negative integer;

a first processor, to determine Y1 candidate resource set(s) from a first candidate resource pool, the Y1 being a positive integer;

a first transmitter, to transmit a first signaling; and a second receiver, to receive first feedback information in a target resource set, the target resource set being one of the Y1 candidate resource set(s).

Herein, the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

The disclosure provides a second communication node for wireless communication, wherein the second communication node includes:

a third receiver, to receive X1 signaling(s) in a first time window, the X1 being a positive integer;

a second processor, to determine Y1 candidate resource set(s) from a first candidate resource pool, the Y1 being a positive integer;

a fourth receiver, to receive a first signaling; and a second transmitter, to transmit first feedback information in a target resource set, the target resource set being one of the Y1 candidate resource set(s).

Herein, the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the method in the disclosure has the following advantages.

The occurrence of collision when a PSFCH is transmitted is avoided or reduced through the signaling monitoring method, the efficiency of transmission of feedback information is greatly improved, the throughput of data transmission and the system capacity are improved.

The collision with the transmission of PSFCH is avoided or reduced by monitoring or sensing a scheduled SCI, and the standard work is simplified while the validity of collision detection is guaranteed.

When PSFCH transmission resources are limited, resources for feedback bundling are determined according to priority or QoS level information, which can guarantee the accurate transmission and timely transmission of high-priority feedback information.

When control channel resources and/or data channel resources transmitted in sidelink are associated with PSFCH resources, the control channel resources and/or data channel resources associated with the excluded PSFCH resources, which are obtained through signaling monitoring, are also excluded from the possible candidate resources for control channel or data channel, to further reduce the possibility of collision.

When feedbacks for different UEs collide or share same feedback resources, the method of feedback bundling may avoid loss of packets due to error feedback, thus improving robustness of transmission.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
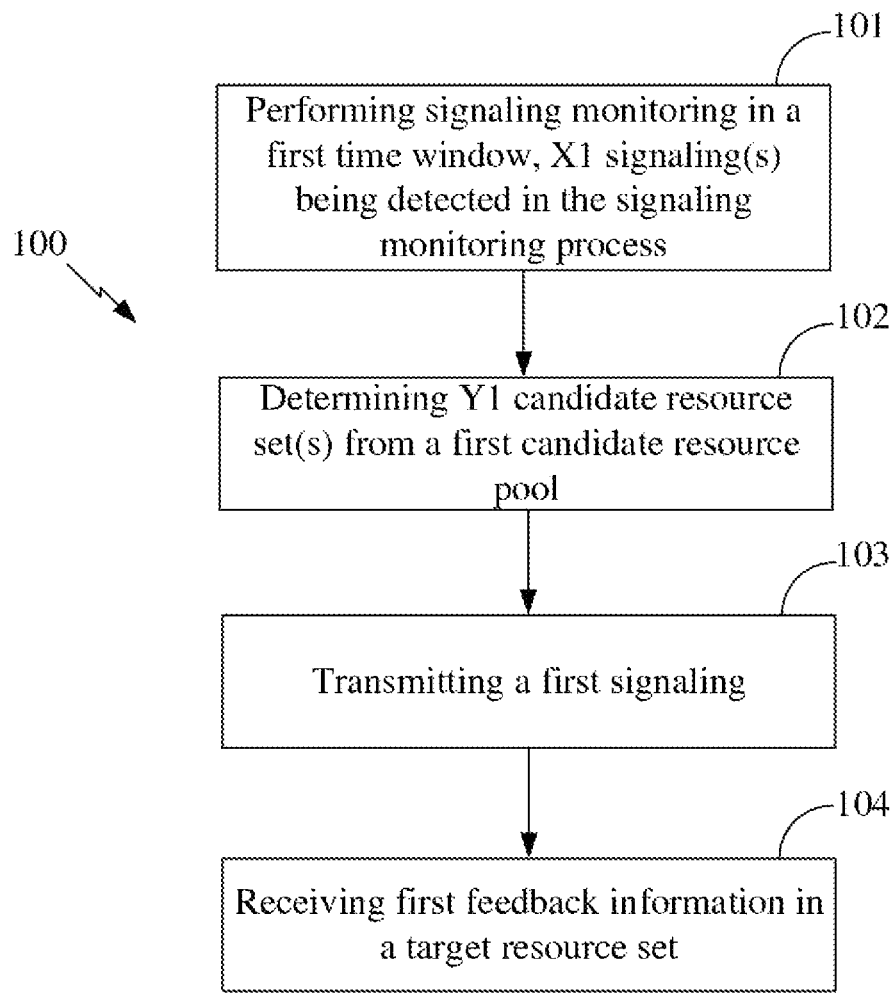
FIG. 1 is a flowchart of X1 signaling(s), Y1 candidate resource set(s), a first signaling and first feedback information according to one embodiment of the disclosure.

Embodiment 1 illustrates an example of a flowchart of X1 signaling(s), Y1 candidate resource set(s), a first signaling and first feedback information according to one embodiment of the disclosure, as shown in FIG. 1. In FIG. 1, each box represents one step, and it should be emphasized that the order of each box in FIG. 1 does not represent the time order between the shown steps.

In Embodiment 1, the first communication node in the disclosure performs signaling monitoring in a first time window, X1 signaling(s) being detected in the signaling monitoring process and the X1 being a non-negative integer, determines Y1 candidate resource set(s) from a first candidate resource pool, the Y1 being a positive integer, transmits a first signaling, and receives first feedback information in a target resource set, the target resource set being one of the Y1 candidate resource set(s); herein, the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the first communication node is one UE.

In one embodiment, the first communication node is one vehicle communication equipment.

In one embodiment, the first communication node is one UE which can perform V2X communication.

In one embodiment, the first communication node supports half duplex only.

In one embodiment, the first communication node can conduct only receiving or conduct only transmitting at any given time.

In one embodiment, the signaling monitoring is not performed in time-domain resources used for transmitting in the first time window.

In one embodiment, the signaling monitoring is not performed in time-domain resources occupied by transmitting in the first time window.

In one embodiment, a time length of the first time window is 0.

In one embodiment, a time length of the first time window is greater than 0.

In one embodiment, a time length of the first time window is greater than 0, but less than a time length of finishing one time of the signaling monitoring.

In one embodiment, the first time window includes X time sub-window(s), the X is a positive integer not less than the X1, and the signaling monitoring is performed in each of the X time sub-window(s).

In one embodiment, the signaling monitoring is implemented by decoding of a signaling.

In one embodiment, the signaling monitoring is implemented by sensing of a signaling.

In one embodiment, the signaling monitoring is implemented by decoding and CRC checking of a signaling.

In one embodiment, the signaling monitoring is implemented by energy detection and decoding of a signaling.

In one embodiment, the signaling monitoring includes decoding of Sidelink Control Information (SCI).

In one embodiment, the signaling monitoring includes sensing of an SCI.

In one embodiment, the signaling monitoring includes decoding of SCIs transmitted by other communication nodes than the first communication node.

In one embodiment, the signaling monitoring includes sensing of SCIs transmitted by other communication nodes than the first communication node.

In one embodiment, the signaling monitoring includes blinding decoding of all candidates transmitting SCIs in the first time window.

In one embodiment, the signaling monitoring includes blinding decoding of all candidates transmitting SCIs in the first time window other than the transmitting time-domain resources of the first communication node.

In one embodiment, the signaling monitoring includes blinding decoding of a given SCI format(s) in all possible candidate time-frequency resources transmitting SCIs in the first time window.

In one embodiment, the signaling monitoring includes blinding decoding of a given SCI format(s) in all possible candidate time-frequency resources transmitting SCIs in the first time window other than the transmitting time-domain resources of the first communication node.

In one embodiment, the signaling monitoring includes the monitoring of a signaling of the second communication node in the disclosure only.

In one embodiment, the signaling monitoring includes the monitoring of a signaling of a target receiver of the first signaling only.

In one embodiment, the signaling monitoring includes the monitoring of a signaling of a communication node other than the second communication node in the disclosure.

In one embodiment, the signaling monitoring includes the monitoring of a signaling of a communication node other than a target receiver of the first signaling.

In one embodiment, only the X1 signaling(s) is(are) detected in the signaling monitoring process.

In one embodiment, a signaling other than the X1 signaling(s) is detected in the signaling monitoring process.

In one embodiment, target receivers of the X1 signalings are the same.

In one embodiment, target receiver(s) of the X1 signaling(s) is(are) the same as a target receiver of the first signaling.

In one embodiment, target receiver(s) of the X1 signaling(s) is(are) the second communication node in the disclosure.

In one embodiment, for a target receiver of the first signaling, only the X1 signaling(s) is(are) detected in the signaling monitoring process.

In one embodiment, for the second communication node in the disclosure, only the X1 signaling(s) is(are) detected in the signaling monitoring process.

In one embodiment, only target receiver(s) of the X1 signaling(s) is(are) detected by a target receiver of the first signaling in the signaling monitoring process.

In one embodiment, only target receiver(s) of the X1 signaling(s) is(are) detected by the second communication node in the disclosure in the signaling monitoring process.

In one embodiment, the phrase that the X1 signaling(s) is(are) detected in the signaling monitoring process includes the following meaning: a CRC check for any one of the X1 signaling(s) after channel decoding is passed.

In one embodiment, the phrase that the X1 signaling(s) is(are) detected in the signaling monitoring process includes the following meaning: a CRC check for any one of the X1 signaling(s) after channel decoding is passed using a CRC scrambled with a signature identifier of a target receiver of the first signaling.

In one embodiment, the phrase that the X1 signaling(s) is(are) detected in the signaling monitoring process includes the following meaning: a CRC check for any one of the X1 signaling(s) after channel decoding is passed using a CRC scrambled with a signature identifier of the second communication node in the disclosure.

In one embodiment, the phrase that the X1 signaling(s) is(are) detected in the signaling monitoring process includes the following meaning: a CRC check for any one of the X1 signaling(s) after channel decoding is passed using a CRC scrambled with an ID of the second communication node in the disclosure.

In one embodiment, the phrase that the X1 signaling(s) is(are) used for determining Y2 candidate resource set(s) includes the following meaning: the X1 signaling(s) is(are) used by the first communication node in the disclosure to determine the Y2 candidate resource set(s).

In one embodiment, the phrase that the X1 signaling(s) is(are) used for determining Y2 candidate resource set(s) includes the following meaning: the X1 signaling(s) is(are) used for indicating the Y2 candidate resource set(s) directly.

In one embodiment, the phrase that the X1 signaling(s) is(are) used for determining Y2 candidate resource set(s) includes the following meaning: the X1 signaling(s) is(are) used for indicating the Y2 candidate resource set(s) indirectly.

In one embodiment, the phrase that the X1 signaling(s) is(are) used for determining Y2 candidate resource set(s) includes the following meaning: the X1 signaling(s) is(are) used for indicating the Y2 candidate resource set(s) explicitly.

In one embodiment, the phrase that the X1 signaling(s) is(are) used for determining Y2 candidate resource set(s) includes the following meaning: the X1 signaling(s) is(are) used for indicating the Y2 candidate resource set(s) implicitly.

In one embodiment, the phrase that the X1 signaling(s) is(are) used for determining Y2 candidate resource set(s) includes the following meaning: the X1 signaling(s) is(are) used for indicating X1 candidate resource set(s) respectively, the X1 candidate resource set(s) is(are) the Y2 candidate resource set(s) respectively, and the X1 is equal to the Y2.

In one embodiment, the phrase that the X1 signaling(s) is(are) used for determining Y2 candidate resource set(s) includes the following meaning: the X1 signalings are used for indicating X1 candidate resource sets respectively, any one of the Y2 candidate resource sets is one of the X1 candidate resource sets, any two of the Y2 candidate resource sets are different, the X1 candidate resource sets include two same candidate resource sets, and the X1 is greater than the Y2.

In one embodiment, the X1 signaling(s) is(are) further used for determining a candidate resource set other than the Y2 candidate resource set(s).

In one embodiment, the X1 is equal to 0.

In one embodiment, the X1 is greater than 0.

In one embodiment, the first candidate resource pool includes a positive integer number of candidate resource sets, and any one of the Y1 candidate resource set(s) is one candidate resource set in the first candidate resource pool.

In one embodiment, the first candidate resource pool includes a positive integer number of candidate resource sets, and any one of the Y1 candidate resource set(s) is one candidate resource set in the first candidate resource pool; and any one candidate resource set in the first candidate resource pool includes at least one of time-frequency resources, code-domain resources, and bit resources in information bits.

In one embodiment, the first candidate resource pool includes a positive integer number of candidate resource sets, and any one of the Y1 candidate resource set(s) is one candidate resource set in the first candidate resource pool; and any one candidate resource set in the first candidate resource pool includes bit resources in information bits in a PSFCH.

In one embodiment, the first candidate resource pool includes a positive integer number of candidate resource sets, and any one of the Y1 candidate resource set(s) is one candidate resource set in the first candidate resource pool; and any one candidate resource set in the first candidate resource pool includes bits in a payload of Feedback Control Information (FCI).

In one embodiment, the first candidate resource pool includes a positive integer number of candidate resource sets, and any one of the Y1 candidate resource set(s) is one candidate resource set in the first candidate resource pool; and any one candidate resource set in the first candidate resource pool includes partial bit resources in information bits in a PSFCH.

In one embodiment, the first candidate resource pool includes a positive integer number of candidate resource sets, and any one of the Y1 candidate resource set(s) is one candidate resource set in the first candidate resource pool; and any one candidate resource set in the first candidate resource pool includes partial bits in a payload of FCI.

In one embodiment, the first candidate resource pool includes a positive integer number (greater than 1) of candidate resource sets, and any one of the Y1 candidate resource set(s) is one candidate resource set in the first candidate resource pool; and any two candidate resource sets in the first candidate resource pool include orthogonal time-frequency resources.

In one embodiment, the first candidate resource pool includes a positive integer number (greater than 1) of candidate resource sets, and any one of the Y1 candidate resource set(s) is one candidate resource set in the first candidate resource pool; and any two candidate resource sets in the first candidate resource pool include different time-frequency resources.

In one embodiment, the first candidate resource pool includes a positive integer number (greater than 1) of candidate resource sets, and any one of the Y1 candidate resource set(s) is one candidate resource set in the first candidate resource pool; and two candidate resource sets in the first candidate resource pool include non-orthogonal time-frequency resources.

In one embodiment, the first candidate resource pool includes a positive integer number (greater than 1) of candidate resource sets, and any one of the Y1 candidate resource set(s) is one candidate resource set in the first candidate resource pool; and two candidate resource sets in the first candidate resource pool include overlapping time-frequency resources.

In one embodiment, the first candidate resource pool includes a positive integer number (greater than 1) of candidate resource sets, and any one of the Y1 candidate resource set(s) is one candidate resource set in the first candidate resource pool; any two candidate resource sets in the first candidate resource pool include same time-frequency resources, and any two candidate resource sets in the first candidate resource pool include different code-domain resources.

In one embodiment, the first candidate resource pool includes a positive integer number (greater than 1) of candidate resource sets, and any one of the Y1 candidate resource set(s) is one candidate resource set in the first candidate resource pool; any two candidate resource sets in the first candidate resource pool include same time-frequency resources, and any two candidate resource sets in the first candidate resource pool include different bit resources in information bits.

In one embodiment, the first candidate resource pool includes a positive integer number (greater than 1) of candidate resource sets, and any one of the Y1 candidate resource set(s) is one candidate resource set in the first candidate resource pool; and two candidate resource sets in the first candidate resource pool include different information bits in a payload of FCI carried in one PSFCH.

In one embodiment, the phrase that determining Y1 candidate resource set(s) from the first candidate resource pool includes the following meaning: the first communication node determines the Y1 candidate resource set(s) from the first candidate resource pool.

In one embodiment, any one of the Y1 candidate resource set(s) includes at least one of time-frequency resources, code-domain resources, and bit resources in information bits.

In one embodiment, any one of the Y2 candidate resource set(s) includes at least one of time-frequency resources, code-domain resources, and bit resources in information bits.

In one embodiment, any two of the Y1 candidate resource sets include orthogonal time-frequency resources, the Y1 being greater than 1.

In one embodiment, any two of the Y1 candidate resource sets include different time-frequency resources, the Y1 being greater than 1.

In one embodiment, two of the Y1 candidate resource sets include non-orthogonal time-frequency resources, the Y1 being greater than 1.

In one embodiment, two of the Y1 candidate resource sets include overlapping time-frequency resources, the Y1 being greater than 1.

In one embodiment, any two of the Y1 candidate resource sets include same time-frequency resources, and any two of the Y1 candidate resource sets include different code-domain resources, the Y1 being greater than 1.

In one embodiment, any two of the Y1 candidate resource sets include same time-frequency resources, and any two of the Y1 candidate resource sets include different bit resources in information bit, the Y1 being greater than 1.

In one embodiment, two of the Y1 candidate resource sets include different information bits in a payload of FCI carried in one PSFCH, the Y1 being greater than 1.

In one embodiment, the first signaling is a physical layer signaling.

In one embodiment, the first signaling is a higher layer signaling.

In one embodiment, the first signaling is broadcast.

In one embodiment, the first signaling is unicast.

In one embodiment, the first signaling is transmitted through a sidelink.

In one embodiment, the first signaling caries an SCI.

In one embodiment, the first signaling caries partial or all fields in one SCI.

In one embodiment, the first signaling is transmitted through a Physical Sidelink Control Channel (PSCCH).

In one embodiment, the first signaling is transmitted through a Physical Sidelink Shared Channel (PSSCH).

In one embodiment, the first signaling caries partial or all Information Elements (IEs) in one Radio Resource Control (RRC) signaling.

In one embodiment, the first signaling caries partial or all fields in one IE in one RRC signaling.

In one embodiment, a target receiver of the first signaling is the second communication node in the disclosure.

In one embodiment, the phrase that the first signaling is used for indicating the target resource set includes the following meaning: the first signaling indicates the target resource set directly.

In one embodiment, the phrase that the first signaling is used for indicating the target resource set includes the following meaning: the first signaling indicates the target resource set indirectly.

In one embodiment, the phrase that the first signaling is used for indicating the target resource set includes the following meaning: the first signaling indicates the target resource set explicitly.

In one embodiment, the phrase that the first signaling is used for indicating the target resource set includes the following meaning: the first signaling indicates the target resource set implicitly.

In one embodiment, the phrase that the first signaling is used for indicating the target resource set includes the following meaning: the first signaling is used for indicating the target resource set from the Y1 candidate resource set(s).

In one embodiment, the phrase that the first signaling is used for indicating the target resource set includes the following meaning: the first signaling is used for indicating Y3 candidate resource sets from the Y1 candidate resource sets, any one of the Y3 candidate resource sets is one of the Y1 candidate resource sets, the Y3 is a positive integer greater than 1, and the Y1 is greater than the Y3; the target resource set is one of the Y3 candidate resource sets and the second communication node in the disclosure selects the target resource set from the Y3 candidate resource sets autonomously.

In one embodiment, the phrase that the first signaling is used for indicating the target resource set includes the following meaning: the first signaling is used for indicating Y3 candidate resource sets from the Y1 candidate resource sets, any one of the Y3 candidate resource sets is one of the Y1 candidate resource sets, the Y3 is a positive integer greater than 1, and the Y1 is greater than the Y3; the target resource set is one of the Y3 candidate resource sets and the second communication node in the disclosure selects the target resource set from the Y3 candidate resource sets randomly.

In one embodiment, the phrase that the first signaling is used for indicating the target resource set includes the following meaning: the first signaling is used for indicating Y3 candidate resource sets from the Y1 candidate resource sets, any one of the Y3 candidate resource sets is one of the Y1 candidate resource sets, the Y3 is a positive integer greater than 1, and the Y1 is greater than the Y3; the target resource set is one of the Y3 candidate resource sets and a transmitter of the first feedback information selects the target resource set from the Y3 candidate resource sets autonomously.

In one embodiment, the phrase that the first signaling is used for indicating the target resource set includes the following meaning: the first signaling is used for indicating Y3 candidate resource sets from the Y1 candidate resource sets, any one of the Y3 candidate resource sets is one of the Y1 candidate resource sets, the Y3 is a positive integer greater than 1, and the Y1 is greater than the Y3; the target resource set is one of the Y3 candidate resource sets and a transmitter of the first feedback information selects the target resource set from the Y3 candidate resource sets randomly.

In one embodiment, the first feedback information is one piece of physical layer information.

In one embodiment, the first feedback information is one piece of higher layer information.

In one embodiment, the first feedback information caries partial or all fields in an FCI.

In one embodiment, the first feedback information is an FCI.

In one embodiment, the first feedback information is transmitted through a Physical Sidelink Feedback (PSFCH).

In one embodiment, the first feedback information includes feedback information transmitted by the second communication node in the disclosure to the first communication node.

In one embodiment, the first feedback information includes HARQ-ACK information.

In one embodiment, an end of the first time window is earlier than a start of transmitting the first signaling.

In one embodiment, an end of the first time window is a start of transmitting the first signaling.

In one embodiment, the air interface is a radio interface employed for communication between the first communication node in the disclosure and the second communication node in the disclosure.

In one embodiment, the air interface is a radio interface employed for communication between the first communication node in the disclosure and another UE.

In one embodiment, the air interface is PC5 interface.

In one embodiment, the air interface is a radio interface between UEs.

In one embodiment, the air interface is a radio interface for sidelink transmission.

Embodiment 2

Figure 2:
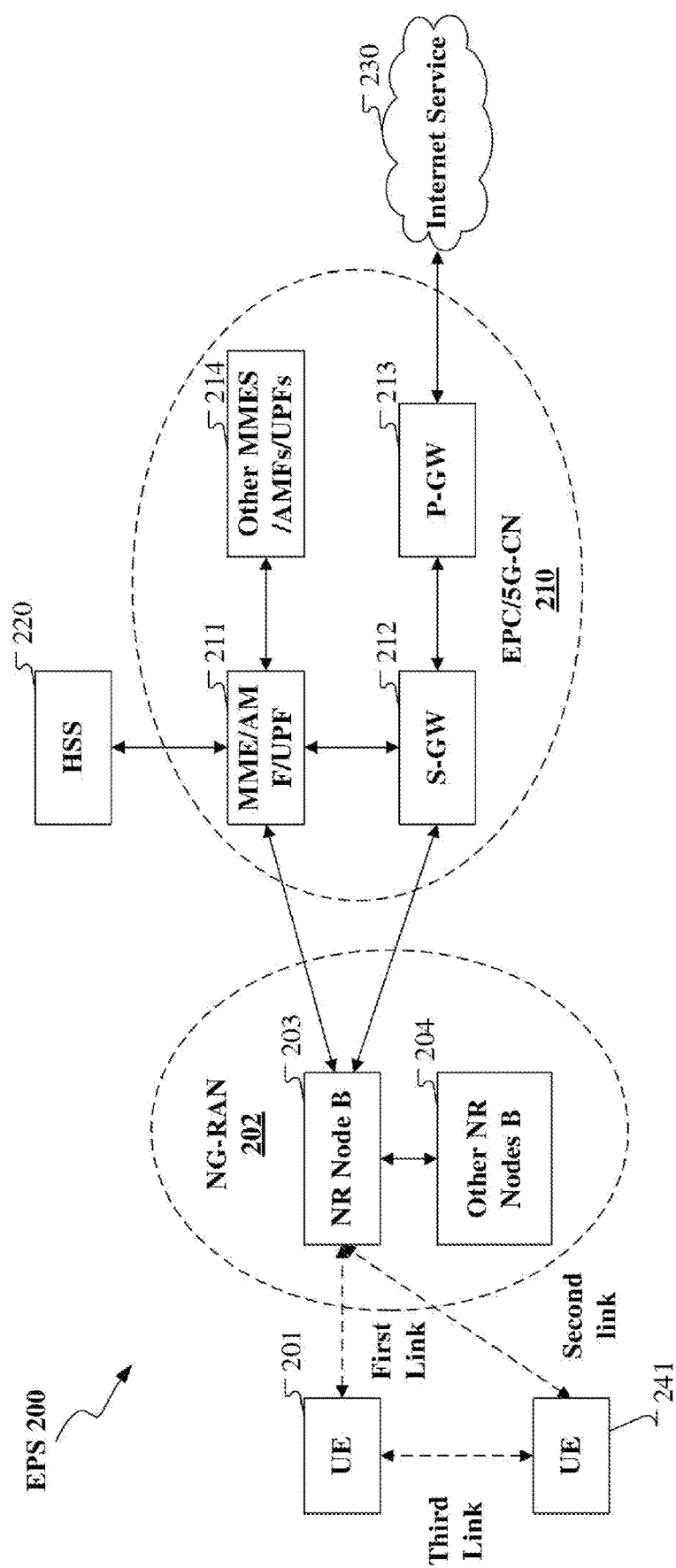
FIG. 2 is a diagram illustrating a network architecture according to one embodiment of the disclosure.

Embodiment 2 illustrates an example of a diagram of a network architecture, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. In V2X networks, gNB 203 may be a base station, a ground base station relayed by a satellite or a Road Side Unit (RSU). The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobiles terminals, V2X equipment or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first communication node in the disclosure.

In one embodiment, the UE 201 supports transmission in sidelink.

In one embodiment, the UE 201 supports a PC5 interface.

In one embodiment, the UE 201 supports a V2X network.

In one embodiment, the UE 201 supports V2X services.

In one embodiment, the UE 241 corresponds to the first communication node in the disclosure.

In one embodiment, the UE 241 supports transmission in sidelink.

In one embodiment, the UE 241 supports a PC5 interface.

In one embodiment, the UE 241 supports a V2X network.

In one embodiment, the UE 241 supports V2X services.

In one embodiment, the third link is a sidelink.

In one embodiment, the third link performs communication via a PC5 interface.

In one embodiment, the first communication node is in coverage.

In one embodiment, the first communication node is out of coverage.

In one embodiment, the second communication node is in coverage.

In one embodiment, the second communication node is out of coverage.

In one embodiment, the first communication node and the second communication node are in coverage of one same cell.

In one embodiment, the first communication node and the second communication node are in coverages of different cells.

Embodiment 3

Figure 3:
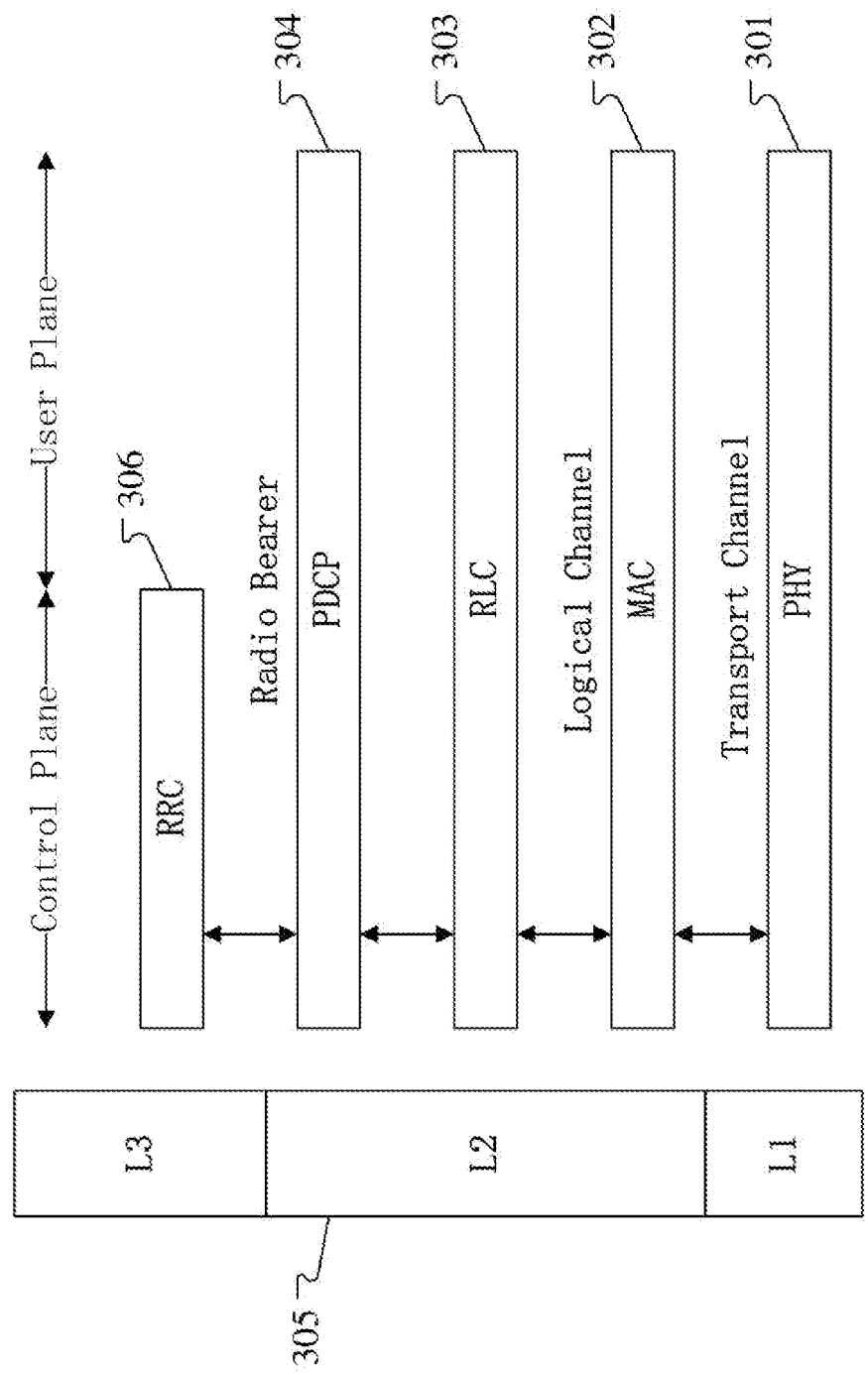
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a first communication node (UE or RSU in V2X) and a second communication node (UE or RSU in V2X) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304. Although not shown in FIG. 3, the first communication node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for handover of the first communication node between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) between the first communication node and the second communication node. The MAC sublayer 302 is also in charge of HARQ operations. In the control plane, the radio protocol architecture of the first communication node and the second communication node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the first communication node and the second communication node.

In one embodiment, the radio protocol architecture shown in FIG. 3 is applicable to the first communication node in the disclosure.

In one embodiment, the radio protocol architecture shown in FIG. 3 is applicable to the second communication node in the disclosure.

In one embodiment, any one of the X1 signaling(s) in the disclosure is generated on the RRC 306.

In one embodiment, any one of the X1 signaling(s) in the disclosure is generated on the MAC 302.

In one embodiment, any one of the X1 signaling(s) in the disclosure is generated on the PHY 301.

In one embodiment, the first signaling in the disclosure is generated on the RRC 306.

In one embodiment, the first signaling in the disclosure is generated on the MAC 302.

In one embodiment, the first signaling in the disclosure is generated on the PHY 301.

In one embodiment, the first feedback information in the disclosure is generated on the MAC 302.

In one embodiment, the first feedback information in the disclosure is generated on the PHY 301.

In one embodiment, the first radio signal in the disclosure is generated on the RRC 306.

In one embodiment, the first radio signal in the disclosure is generated on the MAC 302.

In one embodiment, the first radio signal in the disclosure is generated on the PHY 301.

Embodiment 4

Figure 4:
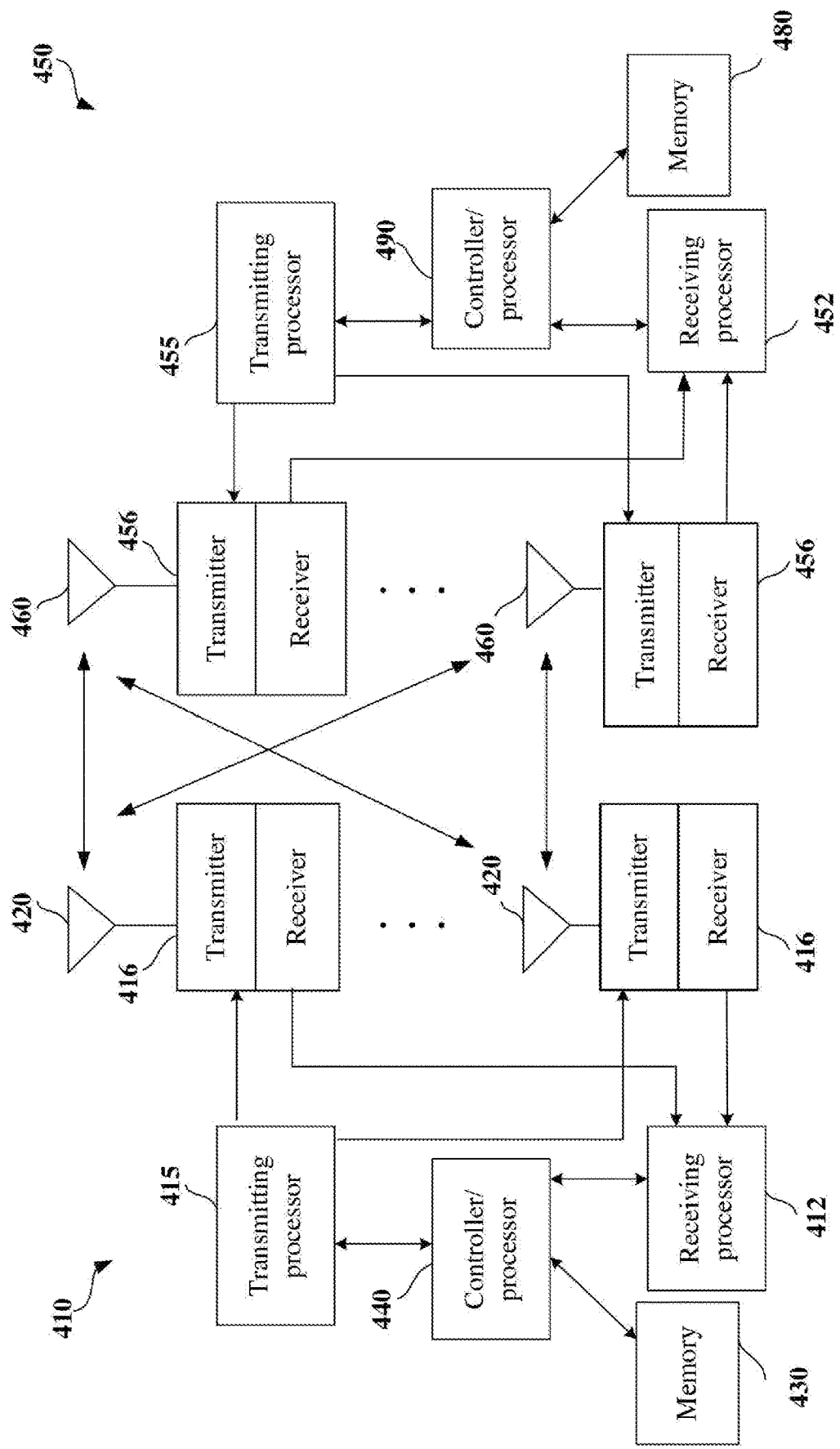
FIG. 4 is a diagram illustrating a first communication node and a second communication node according to one embodiment of the disclosure.

Embodiment 4 illustrates a diagram of a first communication node and a second communication node according to the disclosure, as shown in FIG. 4.

The first communication node 400 includes a controller/processor 440, a memory 430, a receiving processor 412, a transmitter/receiver 416 including an antenna 420, and a transmitting processor 415. A data source provides a higher-layer packet to the controller/processor 440. The controller/processor 440 provides header compression/decompression, encryption/deencryption, packet segmentation and reordering, multiplexing and de-multiplexing between a logical channel and a transport channel, to implement L2 protocols. The higher-layer packet may include data or control information, for example, SL-SCH. The transmitting processor 415 performs various signal transmitting processing functions used for L1 layer (that is, PHY), including encoding, interleaving, scrambling, modulation, power control/allocation, precoding, and generation of physical layer control signalings. The receiving processor 412 performs various signal receiving processing functions used for L1 layer (that is, PHY), including decoding, de-interleaving, descrambling, demodulation, de-precoding, and extraction of physical layer control signalings, etc. The transmitter 416 is configured to convert the baseband signal provided by the transmitting processor 415 into a radio-frequency signal and transmit the radio-frequency signal via the antenna 420. The receiver 416 converts a radio-frequency signal received via the corresponding antenna 420 into a baseband signal and provides the baseband signal to the receiving processor 412. Components in the second communication node 450 are the same as corresponding components in the first communication node 400.

In sidelink transmission, a higher-layer packet (for example, the first radio signal in the disclosure) is provided to the controller/processor 440, and the controller/processor 440 implements functions of L2 layer. In sidelink transmission, the controller/processor 440 provides header compression, encryption, packet segmentation and reordering, multiplexing a logical channel and a transport channel. The controller/processor 440 is also in charge of HARQ operations (if supported), retransmission, and signalings to the UE 450. The transmitting processor 415 performs various signal processing functions used for L1 layer (that is, PHY), including encoding, interleaving, scrambling, modulation, power control/allocation, precoding, and generation of physical layer control signalings, etc. The generation of both the first signaling and the first radio signal in the disclosure is completed at the transmitting processor 415; modulated symbols are split into parallel streams and each stream is mapped to corresponding multicarrier subcarriers and/or multicarrier symbols, and then the transmitting processor 415 maps it to the antenna 420 via the transmitter 416 to transmit out in form of Radio Frequency (RF) signal. At the receiving terminal, each receiver 456 receives an RF signal via the corresponding antenna 460; each receiver 454 recovers the baseband information modulated onto the RF carrier and provides the baseband information to the receiving processor 452. The receiving processor 452 performs various signal receiving processing functions used for L1 layer. The signal receiving processing functions include reception of physical layer signals of the first signaling and the first radio signal in the disclosure, etc.; multicarrier symbols in the multicarrier symbol streams are demodulated corresponding to different modulation schemes (for example, BPSK and QPSK), and then are descrambled, decoded and deinterleaved to recover the data or control signals on a physical channel transmitted by the first communication node 400, then the data and control signals are provided to the controller/processor 490. The controller/processor 490 implements functions of L2 layer, and the controller/processor 490 interprets the first radio signal in the disclosure. The controller/processor may be connected to a memory 480 that stores program codes and data. The memory 480 may be a computer readable medium. Particularly, for the signaling monitoring in the disclosure, in the UE 400, each receiver 416 receives an RF signal of a signal monitored by the signaling monitoring via the corresponding antenna 420; each receiver 416 recovers the baseband information modulated onto the RF carriers, and provides the baseband information to the receiving processor 412, and the receiving processor 412 judges that the X1 signaling(s) in the disclosure is(are) detected in the signaling monitoring process. The first feedback information in the disclosure is generated in the transmitting processor 455 in the UE 450, and then is mapped to the antenna 460 via the transmitter 456 to be transmitted out in form of RF signal.

In one embodiment, the first communication node 400 includes at least one processor and at least one memory. The at least one memory includes computer program codes. The at least one memory and the computer program codes are configured to be used in collaboration with the at least one processor. The first communication node 400 at least performs signaling monitoring in a first time window, X1 signaling(s) being detected in the signaling monitoring process and the X1 being a non-negative integer; determines Y1 candidate resource set(s) from a first candidate resource pool, the Y1 being a positive integer; transmits a first signaling; and receives first feedback information in a target resource set, the target resource set being one of the Y1 candidate resource set(s); wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the first communication node 400 includes a memory that stores a computer readable instruction program. The computer readable instruction program generates an action when executed by at least one processor. The action includes: performing signaling monitoring in a first time window, X1 signaling(s) being detected in the signaling monitoring process and the X1 being a non-negative integer; determining Y1 candidate resource set(s) from a first candidate resource pool, the Y1 being a positive integer; transmitting a first signaling; and receiving first feedback information in a target resource set, the target resource set being one of the Y1 candidate resource set(s); wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the second communication node 450 includes at least one processor and at least one memory. The at least one memory includes computer program codes. The at least one memory and the computer program codes are configured to be used in collaboration with the at least one processor. The second communication node 450 at least receives X1 signaling(s) in a first time window, the X1 being a positive integer; determines Y1 candidate resource set(s) from a first candidate resource pool, the Y1 being a positive integer; receives a first signaling; and transmits first feedback information in a target resource set, the target resource set being one of the Y1 candidate resource set(s); wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the second communication node 450 includes a memory that stores a computer readable instruction program. The computer readable instruction program generates an action when executed by at least one processor. The action includes: receiving X1 signaling(s) in a first time window, the X1 being a positive integer; determining Y1 candidate resource set(s) from a first candidate resource pool, the Y1 being a positive integer; receiving a first signaling; and transmitting first feedback information in a target resource set, the target resource set being one of the Y1 candidate resource set(s); wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the receiver 416 (including antenna 420), the receiving processor 412 and the controller/processor 440 are used for the signaling monitoring in the disclosure.

In one embodiment, the receiver 416 (including antenna 420) and the receiving processor 412 are used for the signaling monitoring in the disclosure.

In one embodiment, the receiver 416 (including antenna 420), the receiving processor 412 and the controller/processor 440 are used for receiving the X1 signaling(s) in the disclosure.

In one embodiment, the receiver 416 (including antenna 420) and the receiving processor 412 are used for receiving the X1 signaling(s) in the disclosure.

In one embodiment, the controller/processor 440 is used for determining Y1 candidate resource set(s).

In one embodiment, the transmitter 416 (including antenna 420), the transmitting processor 415 and the controller/processor 440 are used for transmitting the first signaling in the disclosure.

In one embodiment, the transmitter 416 (including antenna 420) and the transmitting processor 415 are used for transmitting the first signaling in the disclosure.

In one embodiment, the receiver 416 (including antenna 420) and the receiving processor 412 are used for receiving the first feedback information in the disclosure.

In one embodiment, the transmitter 416 (including antenna 420), the transmitting processor 415 and the controller/processor 440 are used for transmitting the first radio signal in the disclosure.

In one embodiment, the receiver 456 (including antenna 460), the receiving processor 452 and the controller/processor 490 are used for receiving the X1 signaling(s) in the disclosure.

In one embodiment, the receiver 456 (including antenna 460) and the receiving processor 452 are used for receiving the X1 signaling(s) in the disclosure.

In one embodiment, the controller/processor 490 is used for determining Y1 candidate resource set(s).

In one embodiment, the receiver 456 (including antenna 460), the receiving processor 452 and the controller/processor 490 are used for receiving the first signaling in the disclosure.

In one embodiment, the receiver 456 (including antenna 460) and the receiving processor 452 are used for receiving the first signaling in the disclosure.

In one embodiment, the transmitter 456 (including antenna 460) and the transmitting processor 455 are used for transmitting the first feedback information in the disclosure.

In one embodiment, the receiver 456 (including antenna 460), the receiving processor 452 and the controller/processor 490 are used for receiving the first radio signal in the disclosure.

Embodiment 5

Figure 5:
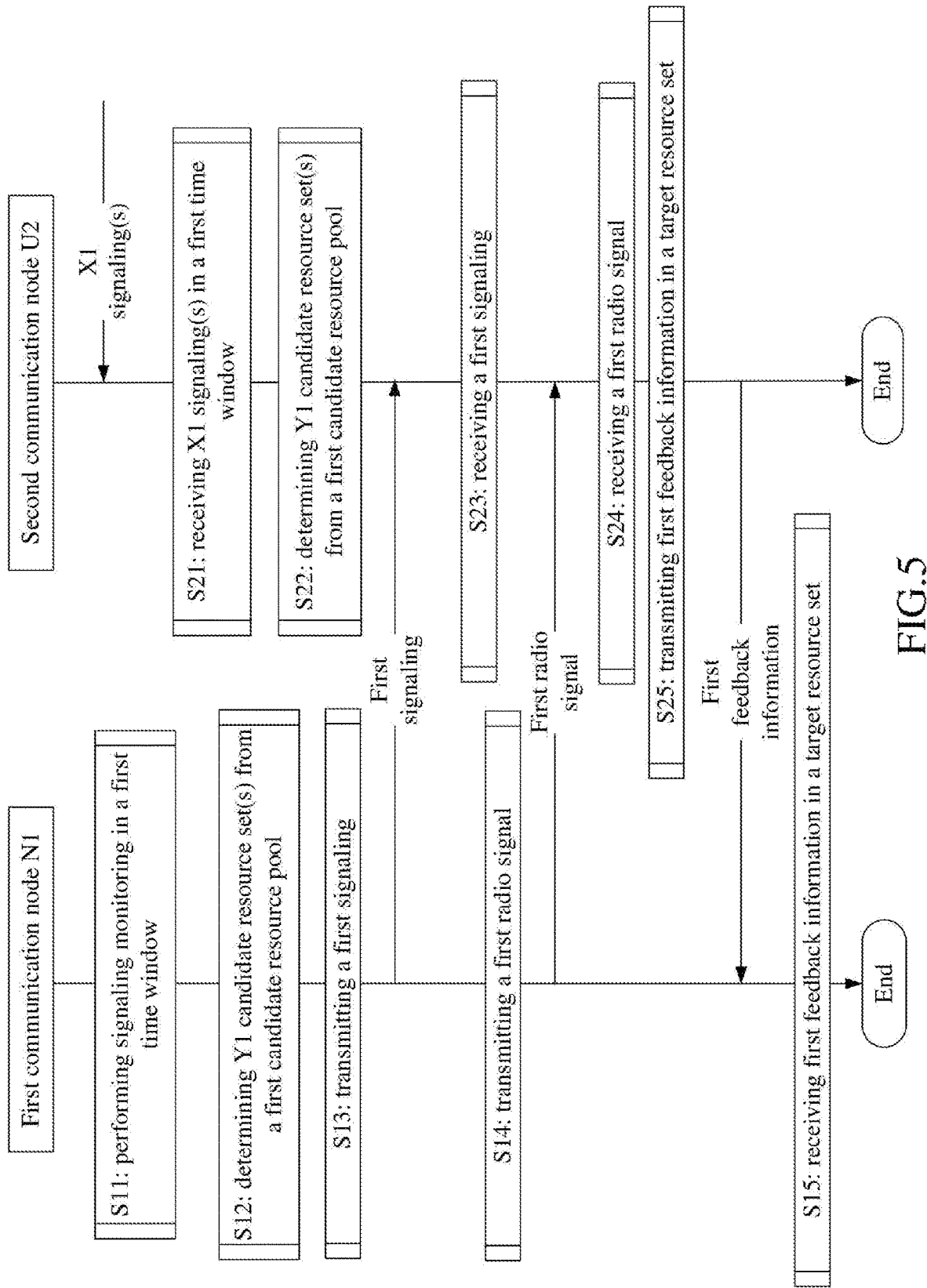
FIG. 5 is a flowchart of transmission of a radio signal according to one embodiment of the disclosure.

Embodiment 5 illustrates an example of a flowchart of transmission of a radio signal according to one embodiment of the disclosure, as shown in FIG. 5. In FIG. 5, a first communication node N1 and a second communication node U2 communicate through a sidelink.

The first communication node N1 performs signaling monitoring in a first time window in S11, determines Y1 candidate resource set(s) from a first candidate resource pool in S12, transmits a first signaling in S13, transmits a first radio signal in S14, and receives first feedback information in a target resource set in S15.

The second communication node U2 receives X1 signaling(s) in a first time window in S21, determines Y1 candidate resource set(s) from a first candidate resource pool in S22, receives a first signaling in S23, receives a first radio signal in S24, and transmits first feedback information in a target resource set in S25.

In Embodiment 5, X1 signaling(s) is(are) detected in the signaling monitoring process and the X1 is a non-negative integer; the Y1 is a positive integer; the target resource set is one of the Y1 candidate resource set(s); the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; the X1 signaling(s), the first signaling and the first feedback information are all transmitted via an air interface; the first signaling is used for indicating at least one of time-frequency resources occupied by the first radio signal, an MCS employed by the first radio signal or an RV employed by the first radio signal; the first feedback information is used for determining whether the first radio signal is correctly received; and the first radio signal is transmitted via the air interface.

In one embodiment, the first radio signal is transmitted through a Sidelink Shared Channel (SL-SCH).

In one embodiment, the first radio signal is transmitted through a sidelink.

In one embodiment, the first radio signal is transmitted via a PC5 interface.

In one embodiment, the first radio signal is unicast.

In one embodiment, the first radio signal is multicast.

In one embodiment, the first radio signal is transmitted through a Physical Sidelink Shared Channel (PSSCH).

In one embodiment, one bit block is processed in sequence through CRC insertion, channel coding, rate matching, scrambling, modulation, layer mapping, precoding, mapping to virtual resource blocks, mapping from virtual to physical resource blocks, OFDM baseband signal generation, modulation and upconversion to obtain the first radio signal.

In one embodiment, one bit block is processed in sequence through CRC insertion, segmentation, coding block-level CRC insertion, channel coding, rate matching, concatenation, scrambling, modulation, layer mapping, precoding, mapping to virtual resource blocks, mapping from virtual to physical resource blocks, OFDM baseband signal generation, modulation and upconversion to obtain the first radio signal.

In one embodiment, one bit block is processed in sequence through CRC insertion, channel coding, rate matching, scrambling, modulation, layer mapping, transform precoding, precoding, mapping to virtual resource blocks, mapping from virtual to physical resource blocks, OFDM baseband signal generation, modulation and upconversion to obtain the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating time-frequency resources occupied by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating an MCS employed by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating an RV employed by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating time-frequency resources occupied by the first radio signal and an MCS employed by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating time-frequency resources occupied by the first radio signal and an RV employed by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating an MCS employed by the first radio signal and an RV employed by the first radio signal.

In one embodiment, the phrase that the first signaling is used for indicating at least one of time-frequency resources occupied by the first radio signal, an MCS employed by the first radio signal or an RV employed by the first radio signal includes the following meaning: the first signaling is used for indicating time-frequency resources occupied by the first radio signal, an MCS employed by the first radio signal and an RV employed by the first radio signal.

In one embodiment, the phrase that the first feedback information is used for determining whether the first radio signal is correctly received includes the following meaning: the first feedback information is used by the first communication node to determine whether the first radio signal is correctly received.

In one embodiment, the phrase that the first feedback information is used for determining whether the first radio signal is correctly received includes the following meaning: the first feedback information indicates directly whether the first radio signal is correctly received.

In one embodiment, the phrase that the first feedback information is used for determining whether the first radio signal is correctly received includes the following meaning: the first feedback information indicates indirectly whether the first radio signal is correctly received.

In one embodiment, the phrase that the first feedback information is used for determining whether the first radio signal is correctly received includes the following meaning: the first feedback information indicates explicitly whether the first radio signal is correctly received.

In one embodiment, the phrase that the first feedback information is used for determining whether the first radio signal is correctly received includes the following meaning: the first feedback information indicates implicitly whether the first radio signal is correctly received.

In one embodiment, the phrase that the first feedback information is used for determining whether the first radio signal is correctly received includes the following meaning: the first feedback information is used for indicating whether the first radio signal is not correctly received.

Embodiment 6

Figure 6:
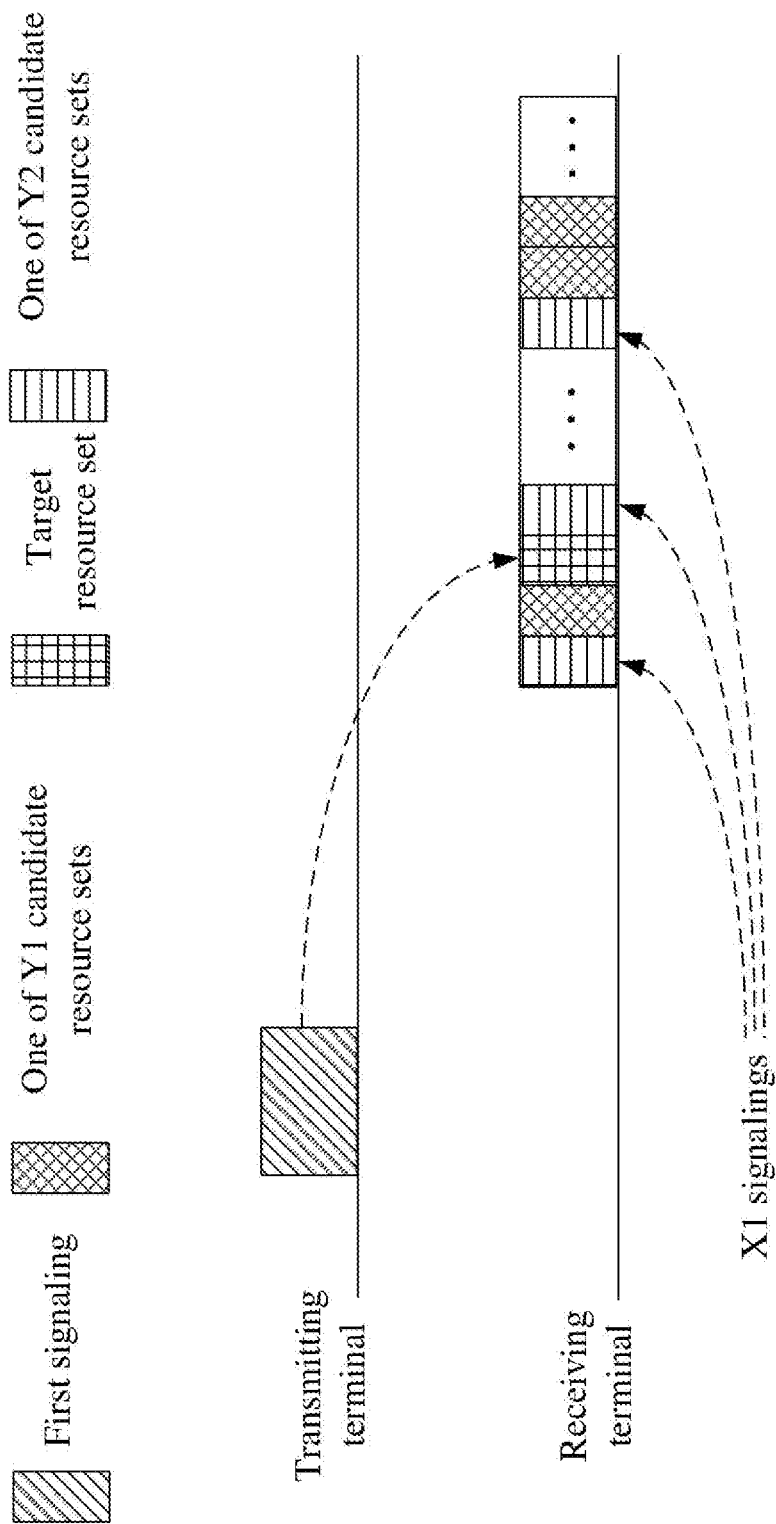
FIG. 6 is a diagram illustrating a relationship between Y1 candidate resource sets and Y2 candidate resource sets according to one embodiment of the disclosure.

Embodiment 6 illustrates an example of a diagram of a relationship between Y1 candidate resource sets and Y2 candidate resource sets according to one embodiment of the disclosure, as shown in FIG. 6. In FIG. 6, a rectangle filled with slashes represents a first signaling, each rectangle filled with cross lines represents one of Y1 candidate resource sets, a rectangle filled with grid lines represents a target resource set, and each rectangle filled with horizontal lines represents one of Y2 candidate resource sets, and a bold-line rectangle represents a first candidate resource pool.

In Embodiment 6, the X1 signalings in the disclosure are used for determining Y2 candidate resource sets, any one of the Y2 candidate resource sets belongs to the first candidate resource pool in the disclosure, any one of the Y1 candidate resource sets in the disclosure is one candidate resource set in the first candidate resource pool other than the Y2 candidate resource sets, and the Y2 is a non-negative integer; the first signaling is used for indicating the target resource set; the first candidate resource pool includes Y candidate resource sets, any one of the Y1 candidate resource sets belongs to one of the Y candidate resource sets, any one of the Y2 candidate resource sets belongs to one of the Y candidate resource sets, and the Y is an integer not less than a summation of the Y1 and the Y2; and time-frequency resources occupied by the first signaling are used for determining the first candidate resource pool.

In one embodiment, the first candidate resource pool includes Y candidate resource sets only.

In one embodiment, the first candidate resource pool includes a candidate resource set other than the Y candidate resource sets.

In one embodiment, any two of the Y candidate resource sets are different, and the Y is greater than 1.

In one embodiment, any two of the Y candidate resource sets are orthogonal, and the Y is greater than 1.

In one embodiment, any two of the Y candidate resource sets are non-overlapping, and the Y is greater than 1.

In one embodiment, the Y is equal to a summation of the Y1 and the Y2.

In one embodiment, the Y is greater than a summation of the Y1 and the Y2.

In one embodiment, the phrase that time-frequency resources occupied by the first signaling are used for determining the first candidate resource pool includes the following meaning: time-frequency resources occupied by the first signaling are used for determining time-frequency resources occupied by the first radio signal in the disclosure, and time-frequency resources occupied by the first radio signal are used for determining the first candidate resource pool.

In one embodiment, the phrase that time-frequency resources occupied by the first signaling are used for determining the first candidate resource pool includes the following meaning: time-frequency resources occupied by the first signaling are used by the first communication node to determine the first candidate resource pool.

In one embodiment, the phrase that time-frequency resources occupied by the first signaling are used for determining the first candidate resource pool includes the following meaning: positions of time-frequency resources occupied by the first signaling in time and frequency domains are used by the first communication node to determine the first candidate resource pool.

In one embodiment, the phrase that time-frequency resources occupied by the first signaling are used for determining the first candidate resource pool includes the following meaning: the first candidate resource pool is a set of all possible resources used for transmission of the first feedback information, which the first signaling may configure among the occupied time-frequency resources.

In one embodiment, the phrase that time-frequency resources occupied by the first signaling are used for determining the first candidate resource pool includes the following meaning: for given time-frequency resources occupied by the first signaling, the first signaling indicates, from M candidate data resource sets, time-frequency resources occupied by the first radio signal in the disclosure, and any one of the M candidate data resource sets is one candidate, which the first signaling may indicate, for the time-frequency resources occupied by the first radio signal in the disclosure; any one of the M candidate data resource sets corresponds to N candidate resource sets, and all candidate resource sets corresponding to the M candidate data resource sets compose the first candidate resource pool.

In one embodiment, the phrase that time-frequency resources occupied by the first signaling are used for determining the first candidate resource pool includes the following meaning: the time-frequency resources occupied by the first signaling are used for determining each candidate resource set in the first candidate resource pool based on a mapping relationship.

Embodiment 7

Figure 7:
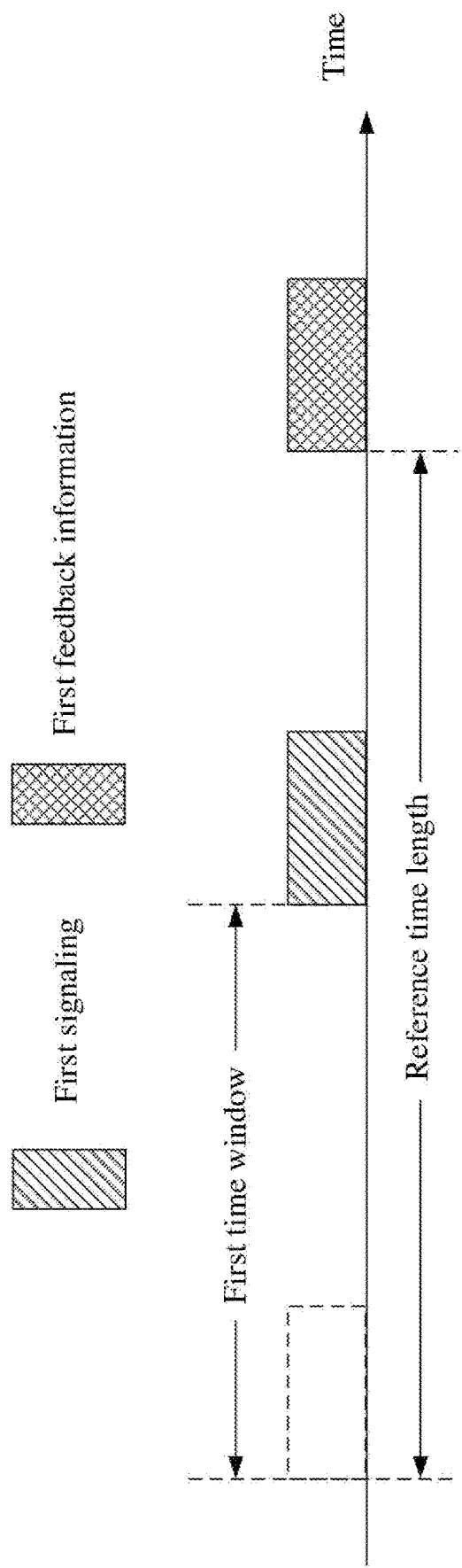
FIG. 7 is a diagram illustrating a relationship between a first time window and a reference time length according to one embodiment of the disclosure.

Embodiment 7 illustrates an example of a diagram of a relationship between a first time window and a reference time length according to one embodiment of the disclosure, as shown in FIG. 7. In FIG. 7, the horizontal axis represents time, a rectangle filled with slashes represents a first signaling, a rectangle filled with cross lines represents first feedback information, and a dash-line blank rectangle represents a virtual first signaling corresponding to a maximum reference time length.

In Embodiment 7, a time length of a time interval between a start of the first time window in the disclosure and a start of receiving the first feedback information in the disclosure is related to a reference time length; and the reference time length is equal to an upper bound of a time interval length between a start of transmitting the first signaling in the disclosure and a start of receiving the first feedback information In one embodiment, the phrase that a time length of a time interval between a start of the first time window and a start of receiving the first feedback information is related to a reference time length includes the following meaning: a time length of a time interval between a start of the first time window and a start of receiving the first feedback information is equal to the reference time length.

In one embodiment, the phrase that a time length of a time interval between a start of the first time window and a start of receiving the first feedback information is related to a reference time length includes the following meaning: a time length of a time interval between a start of the first time window and a start of receiving the first feedback information has a linear relationship with the reference time length.

In one embodiment, the phrase that a time length of a time interval between a start of the first time window and a start of receiving the first feedback information is related to a reference time length includes the following meaning: a time length of a time interval between a start of the first time window and a start of receiving the first feedback information is in proportion to the reference time length.

In one embodiment, the phrase that a time length of a time interval between a start of the first time window and a start of receiving the first feedback information is related to a reference time length includes the following meaning: a time length of a time interval between a start of the first time window and a start of receiving the first feedback information is greater than the reference time length.

In one embodiment, the phrase that the reference time length is equal to an upper bound of a time interval length between a start of transmitting the first signaling and a start of receiving the first feedback information includes the following meaning: the reference time length is equal to a maximum value among all possible time interval lengths between a start of transmitting the first signaling and a start of receiving the first feedback information.

In one embodiment, the phrase that the reference time length is equal to an upper bound of a time interval length between a start of transmitting the first signaling and a start of receiving the first feedback information includes the following meaning: the reference time length is equal to a maximum value that can be reached between a start of transmitting the first signaling and a start of receiving the first feedback information.

Embodiment 8

Figure 8:
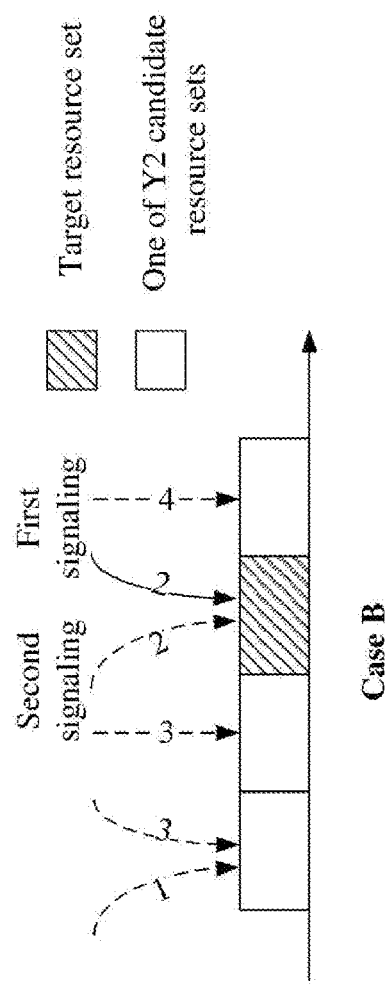
FIG. 8 is a diagram illustrating X1 integers according to one embodiment of the disclosure.
Figure 8:
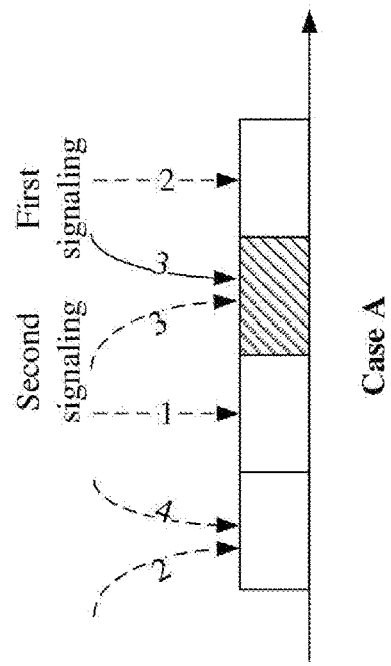

Embodiment 8 illustrates an example of a diagram of X1 integers according to one embodiment of the disclosure, as shown in FIG. 8. In FIG. 8, each arrowed dash line represents one of X1 signalings, a number in each arrowed dash line represents one of X1 integers, an arrowed solid line represents a first signaling, a rectangle filled with slashes represents a target resource set, and each blank rectangle represents one of Y2 candidate resource sets; in case A, the bigger the number among the X1 integers, the lower the indicated priority; in case B, the bigger the number among the X1 integers, the higher the indicated priority.

In Embodiment 8, the X1 in the disclosure is greater than 1, the X1 signalings in the disclosure include a second signaling, the second signaling indicates the target resource set in the disclosure, the X1 signalings indicate X1 integers respectively, and an integer among the X1 integers indicated by the second signaling is a first integer; an integer among the X1 integers other than the first integer is not greater than the first integer, or, an integer among the X1 integers other than the first integer is not less than the first integer; and the first feedback information is a bundling of a feedback for one radio signal scheduled by the first signaling and a feedback for one radio signal scheduled by the second signaling.

In one embodiment, a transmitter of the first signaling is different from a transmitter of the second signaling.

In one embodiment, the phrase that the second signaling indicates the target resource set includes the following meaning: the second signaling indicates the target resource set directly.

In one embodiment, the phrase that the second signaling indicates the target resource set includes the following meaning: the second signaling indicates the target resource set indirectly.

In one embodiment, the phrase that the second signaling indicates the target resource set includes the following meaning: the second signaling indicates the target resource set explicitly.

In one embodiment, the phrase that the second signaling indicates the target resource set includes the following meaning: the second signaling indicates the target resource set implicitly.

In one embodiment, the phrase that the second signaling indicates the target resource set includes the following meaning: the second signaling indicates time-frequency resources occupied by a second radio signal, and the time-frequency resources occupied by the second radio signal are used for determining the target resource set.

In one embodiment, the phrase that the second signaling indicates the target resource set includes the following meaning: the second signaling indicates time-frequency resources occupied by a second radio signal, and the second signaling indicates a mapping relationship between the time-frequency resources occupied by the second radio signal and the target resource set.

In one embodiment, the phrase that the second signaling indicates the target resource set includes the following meaning: the second signaling indicates time-frequency resources occupied by a second radio signal, and the second signaling indicates an offset between the target resource set and the time-frequency resources occupied by the second radio signal.

In one embodiment, each of the X1 integers is one ProSe Per-Packet Priority (PPP).

In one embodiment, each of the X1 integers is one 5G QoS Indicator (5QI).

In one embodiment, the bigger the integer among the X1 integers, the higher the indicated priority.

In one embodiment, the smaller the integer among the X1 integers, the lower the indicated priority.

In one embodiment, the bigger the integer among the X1 integers, the higher the indicated grade.

In one embodiment, the bigger the integer among the X1 integers, the lower the indicated grade.

In one embodiment, the first integer is one maximum integer among the X1 integers.

In one embodiment, the first integer is one minimum integer among the X1 integers.

In one embodiment, an integer among the X1 integers other than the first integer is greater than the first integer.

In one embodiment, an integer among the X1 integers other than the first integer is less than the first integer.

In one embodiment, any two of the X1 integers are equal.

In one embodiment, two of the X1 integers are equal.

In one embodiment, any two of the X1 integers are not equal.

In one embodiment, the X1 signalings indicate X2 candidate resource sets, the target resource set is one of the X2 candidate resource sets, any two of the X2 candidate resource sets are different, and the X2 is a positive integer not greater than the X1; the X2 candidate resource sets are one-to-one corresponding to X2 integers, any one of the X2 integers is one of the X1 integers, a second integer is one of the X2 integers, X3 signalings among the X1 signalings indicate a candidate resource set corresponding to the second integer, and the X3 is a positive integer not greater than the X1; the second integer is equal to a maximum one of the integers indicated by the X3 signalings among the X1 integers, and the first integer is equal to a minimum one of the X2 integers.

In one embodiment, the X1 signalings indicate X2 candidate resource sets, the target resource set is one of the X2 candidate resource sets, any two of the X2 candidate resource sets are different, and the X2 is a positive integer not greater than the X1; the X2 candidate resource sets are one-to-one corresponding to X2 integers, any one of the X2 integers is one of the X1 integers, a second integer is one of the X2 integers, X3 signalings among the X1 signalings indicate a candidate resource set corresponding to the second integer, and the X3 is a positive integer not greater than the X1; the second integer is equal to a minimum one of the integers indicated by the X3 signalings among the X1 integers, and the first integer is equal to a maximum one of the X2 integers.

In one embodiment, the first feedback information is a bundling of a HARQ-ACK for the first radio signal in the disclosure and a HARQ-ACK for one radio signal scheduled by the second signaling.

In one embodiment, the feedback for one radio signal scheduled by the first signaling is a HARQ-ACK feedback.

In one embodiment, the feedback for one radio signal scheduled by the second signaling is a HARQ-ACK feedback.

In one embodiment, the phrase that the first feedback information is a bundling of a feedback for one radio signal scheduled by the first signaling and a feedback for one radio signal scheduled by the second signaling includes the following meaning: the feedback for one radio signal scheduled by the first signaling is a first HARQ-ACK feedback, the feedback for one radio signal scheduled by the second signaling is a second HARQ-ACK feedback, and the first feedback information is a result of bundling of the first HARQ-ACK feedback and the second HARQ-ACK feedback.

In one embodiment, the phrase that the first feedback information is a bundling of a feedback for one radio signal scheduled by the first signaling and a feedback for one radio signal scheduled by the second signaling includes the following meaning: the feedback for one radio signal scheduled by the first signaling is a first HARQ-ACK feedback, the feedback for one radio signal scheduled by the second signaling is a second HARQ-ACK feedback, and the first feedback information is a result of AND operation of the first HARQ-ACK feedback and the second HARQ-ACK feedback.

In one embodiment, the phrase that the first feedback information is a bundling of a feedback for one radio signal scheduled by the first signaling and a feedback for one radio signal scheduled by the second signaling includes the following meaning: the feedback for one radio signal scheduled by the first signaling is a first HARQ-ACK feedback, and the feedback for one radio signal scheduled by the second signaling is a second HARQ-ACK feedback; when the first HARQ-ACK feedback is one ACK and the second HARQ-ACK feedback is one ACK too, the first feedback information is one ACK; when the first HARQ-ACK feedback is one NACK and the second HARQ-ACK feedback is one NACK too, the first feedback information is one NACK; and when one of the first HARQ-ACK feedback and the second HARQ-ACK feedback is a NACK, the first feedback information is one NACK.

Embodiment 9

Figure 9:
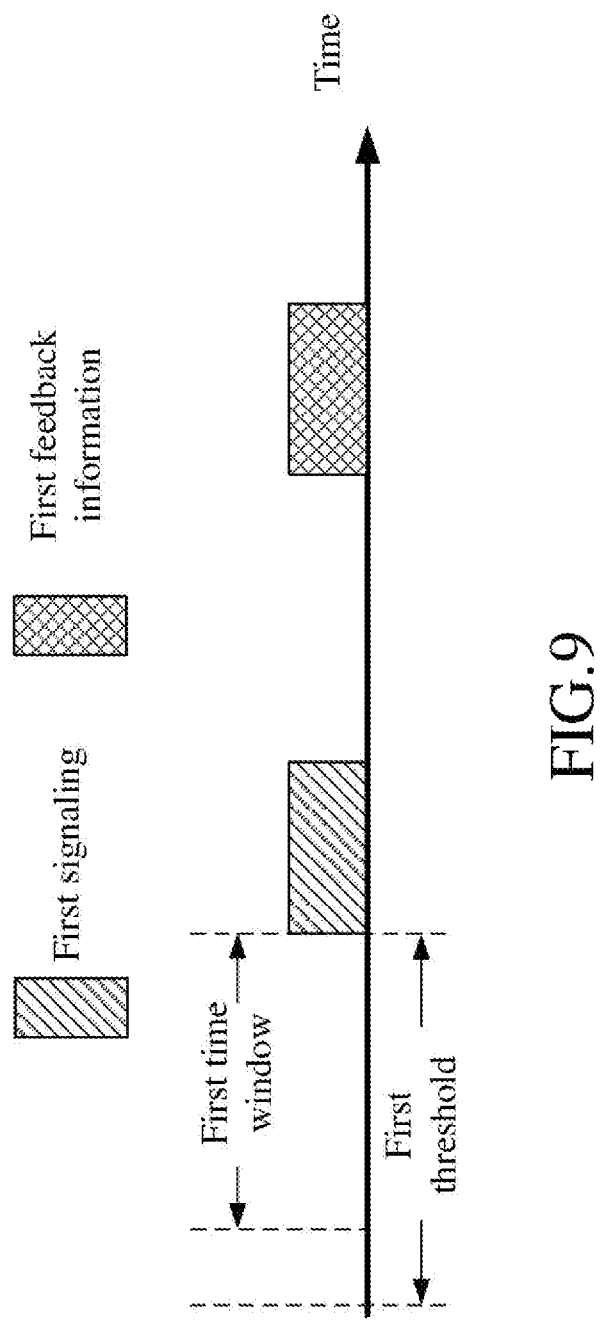
FIG. 9 is a diagram illustrating a relationship between a first time window and a first threshold according to one embodiment of the disclosure.

Embodiment 9 illustrates an example of a diagram of a relationship between a first time window and a first threshold according to one embodiment of the disclosure, as shown in FIG. 9. In FIG. 9, a horizontal axis represents time, a rectangle filled with slashes represents a first signaling, and a rectangle filled with cross lines represents first feedback information.

In Embodiment 9, the signaling monitoring in the disclosure is performed only when a time length of the first time window in the disclosure is not less than a first threshold; the first threshold is predefined, or the first threshold is configured; and when the X1 in the disclosure is equal to 0, the Y2 in the disclosure is equal to 0.

In one embodiment, the first threshold is equal to 0.

In one embodiment, the first threshold is greater than 0.

In one embodiment, the first threshold is equal to a minimum time length of time-domain resources to be occupied by one time of PSCCH transmission.

In one embodiment, when a time length of the first time window is less than a first threshold, the performing of signaling monitoring is abandoned.

In one embodiment, the phrase that the Y2 is equal to 0 means: the Y2 candidate resource sets do not exist.

In one embodiment, the phrase that the Y2 is equal to 0 means: each of the Y2 candidate resource is empty.

In one embodiment, the phrase that the Y2 is equal to 0 means: the Y1 candidate resource sets are the same as the Y candidate resource sets in the disclosure, and the Y1 is equal to the Y.

Embodiment 10

Figure 10:
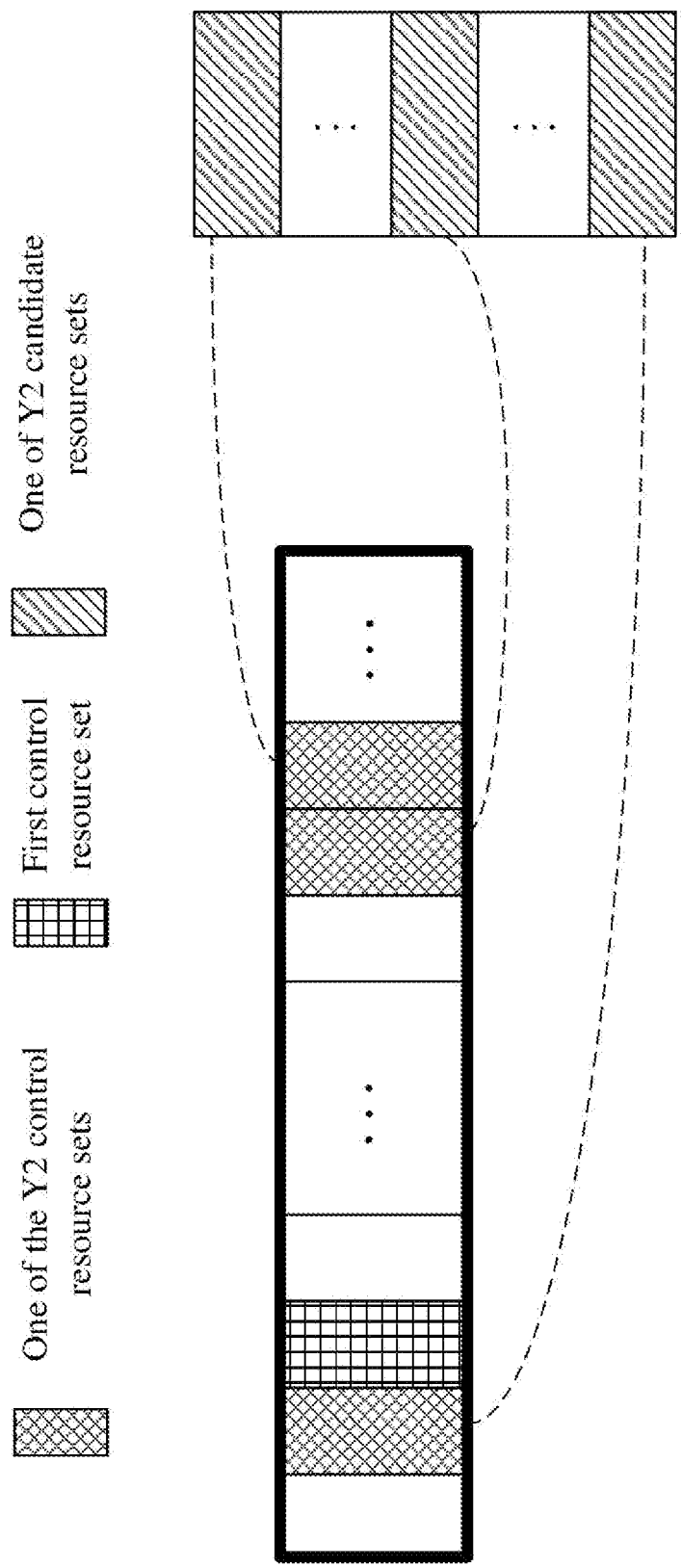
FIG. 10 is a diagram illustrating a first control resource set according to one embodiment of the disclosure.

Embodiment 10 illustrates a diagram of a first control resource set according to one embodiment of the disclosure, as shown in FIG. 10. In FIG. 10, each rectangle filled with cross lines represents one of the Y2 control resource sets, a rectangle filled with grid lines represents a first control resource set, each rectangle filled with slashes represents one of Y2 candidate resource sets, a bold-line box represents a first control resource pool, and a dash-line connection represents a corresponding relationship.

In Embodiment 10, time-frequency resources occupied by the first signaling belong to a first control resource set, the first control resource set belongs to a first control resource pool, the Y2 candidate resource sets in the disclosure are one-to-one corresponding to Y2 control resource sets, and the first control resource set is one control resource set in the first control resource pool other than the Y2 control resource sets.

In one embodiment, any two of the Y2 control resource sets are different, and the Y2 is greater than 1.

In one embodiment, two of the Y2 control resource sets are the same, and the Y2 is greater than 1.

In one embodiment, the first control resource pool includes a positive integer number of candidate control resource sets, and the first control resource set is one of the positive integer number of candidate control resource sets.

In one embodiment, when the Y2 is equal to 0, and the first communication node selects the first control resource set in the first control resource pool autonomously.

In one embodiment, the first communication node selects the first control resource set in the control resources in the first control resource pool other than the Y2 control resource sets autonomously.

In one embodiment, when the Y2 is equal to 0, and the first communication node selects the first control resource set in the first control resource pool randomly.

In one embodiment, the first communication node selects the first control resource set in the control resources in the first control resource pool other than the Y2 control resource sets randomly.

In one embodiment, the first control resource pool is predefined.

In one embodiment, the first control resource pool is configured.

In one embodiment, the first control resource pool is pre-configured.

In one embodiment, the first control resource pool is fixed.

In one embodiment, the phrase that the Y2 candidate resource sets are one-to-one corresponding to Y2 control resource sets includes the following meaning: the Y2 candidate resource sets and the Y2 control resource sets are one-to-one associated.

In one embodiment, the phrase that the Y2 candidate resource sets are one-to-one corresponding to Y2 control resource sets includes the following meaning: the Y2 candidate resource sets and the Y2 control resource sets are one-to-one bundled.

In one embodiment, the phrase that the Y2 candidate resource sets are one-to-one corresponding to Y2 control resource sets includes the following meaning: the Y2 candidate resource sets and the Y2 control resource sets are in one-to-one correspondence according to a mapping relationship.

Embodiment 11

Figure 11:
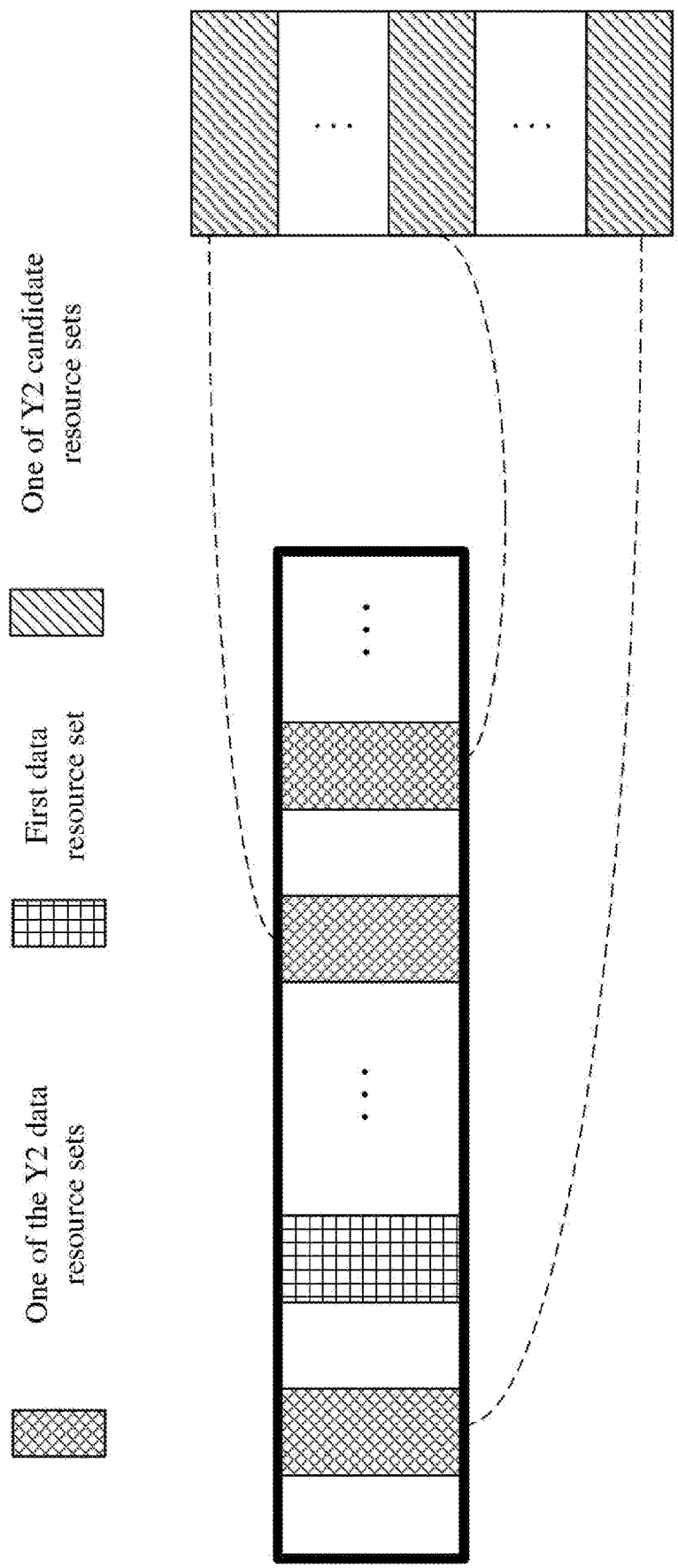
FIG. 11 is a diagram illustrating a first data resource set according to one embodiment of the disclosure.

Embodiment 11 illustrates a diagram of a first data resource set according to one embodiment of the disclosure, as shown in FIG. 11. In FIG. 11, each rectangle filled with cross lines represents one of the Y2 data resource sets, a rectangle filled with grid lines represents a first data resource set, each rectangle filled with slashes represents one of Y2 candidate resource sets, a bold-line box represents a first data resource pool, and a dash-line connection represents a corresponding relationship.

In one embodiment, time-frequency resources occupied by the first radio signal in the disclosure belong to a first data resource set, the first data resource set belongs to a first data resource pool, the Y2 candidate resource sets in the disclosure are one-to-one corresponding to Y2 data resource sets, and the first data resource set is one data resource set in the first data resource pool other than the Y2 data resource sets.

In one embodiment, any two of the Y2 data resource sets are different, and the Y2 is greater than 1.

In one embodiment, two of the Y2 data resource sets are the same, and the Y2 is greater than 1.

In one embodiment, the first data resource pool includes a positive integer number of candidate data resource sets, and the first data resource set is one of the positive integer number of candidate data resource sets.

In one embodiment, when the Y2 is equal to 0, and the first communication node selects the first data resource set in the first data resource pool autonomously.

In one embodiment, the first communication node selects the first data resource set in the data resources in the first data resource pool other than the Y2 data resource sets autonomously.

In one embodiment, when the Y2 is equal to 0, and the first communication node selects the first data resource set in the first data resource pool randomly.

In one embodiment, the first communication node selects the first data resource set in the data resources in the first data resource pool other than the Y2 data resource sets randomly.

In one embodiment, the first data resource pool is predefined.

In one embodiment, the first data resource pool is configured.

In one embodiment, the first data resource pool is pre-configured.

In one embodiment, the first data resource pool is fixed.

In one embodiment, the phrase that the Y2 candidate resource sets are one-to-one corresponding to Y2 data resource sets includes the following meaning: the Y2 candidate resource sets and the Y2 data resource sets are one-to-one associated.

In one embodiment, the phrase that the Y2 candidate resource sets are one-to-one corresponding to Y2 data resource sets includes the following meaning: the Y2 candidate resource sets and the Y2 data resource sets are one-to-one bundled.

In one embodiment, the phrase that the Y2 candidate resource sets are one-to-one corresponding to Y2 data resource sets includes the following meaning: the Y2 candidate resource sets and the Y2 data resource sets are in one-to-one correspondence according to a mapping relationship.

Embodiment 12

Figure 12:
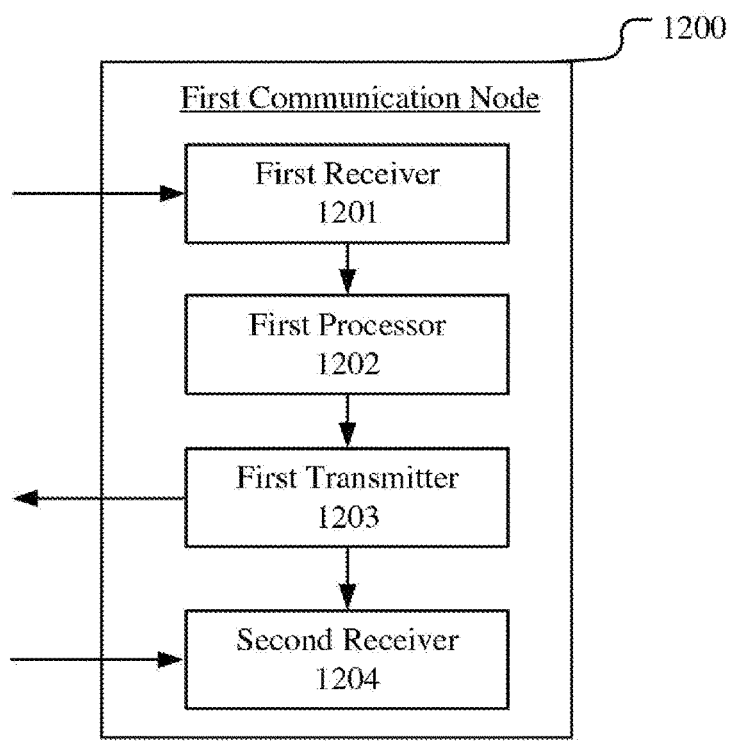
FIG. 12 is a structure block diagram illustrating a processing device in a first communication node according to one embodiment of the disclosure.

Embodiment 12 illustrates an example of a structure block diagram of a processing device in a first communication node, as shown in FIG. 12. In FIG. 12, the processing device 1200 in the first communication node includes a first receiver 1201, a first processor 1202, a first transmitter 1203 and a second receiver 1204. The first receiver 1201 includes the transmitter/receiver 416 (including antenna 420), the receiving processor 412 and the controller/processor 440 in FIG. 4 in the disclosure; the first processor 1202 includes the controller/processor 440 in FIG. 4 in the disclosure; the first transmitter 1203 includes the transmitter/receiver 416 (including antenna 420), the transmitting processor 415 and the controller/processor 440 in FIG. 4 in the disclosure; and the second receiver 1204 includes the transmitter/receiver 416 (including antenna 420), the receiving processor 412 and the controller/processor 440 in FIG. 4 in the disclosure.

In Embodiment 12, the first receiver 1201 performs signaling monitoring in a first time window, X1 signaling(s) being detected in the signaling monitoring process and the X1 being a non-negative integer; the first processor 1202 determines Y1 candidate resource set(s) from a first candidate resource pool, the Y1 being a positive integer; the first transmitter 1203 transmits a first signaling; the second receiver 1204 receives first feedback information in a target resource set, the target resource set being one of the Y1 candidate resource set(s); the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the first candidate resource pool includes Y candidate resource set(s), any one of the Y1 candidate resource set(s) belongs to one of the Y candidate resource set(s), any one of the Y2 candidate resource set(s) belongs to one of the Y candidate resource set(s), and the Y is an integer not less than a summation of the Y1 and the Y2; and time-frequency resources occupied by the first signaling are used for determining the first candidate resource pool.

In one embodiment, a time length of a time interval between a start of the first time window and a start of receiving the first feedback information is related to a reference time length; and the reference time length is equal to an upper bound of a time interval length between a start of transmitting the first signaling and a start of receiving the first feedback information.

In one embodiment, the X1 is greater than 1, the X1 signalings include a second signaling, the second signaling indicates the target resource set, the X1 signalings indicate X1 integers respectively, and an integer among the X1 integers indicated by the second signaling is a first integer; and an integer among the X1 integers other than the first integer is not greater than the first integer, or, an integer among the X1 integers other than the first integer is not less than the first integer.

In one embodiment, the signaling monitoring is performed only when a time length of the first time window is not less than a first threshold; the first threshold is predefined, or the first threshold is configured; and when the X1 is equal to 0, the Y2 is equal to 0.

In one embodiment, the first transmitter 1203 further transmits a first radio signal, and the first signaling is used for indicating at least one of time-frequency resources occupied by the first radio signal, an MCS employed by the first radio signal or an RV employed by the first radio signal; the first feedback information is used for determining whether the first radio signal is correctly received; and the first radio signal is transmitted via the air interface.

In one embodiment, time-frequency resources occupied by the first signaling belong to a first control resource set, the first control resource set belongs to a first control resource pool, the Y2 candidate resource set(s) is(are) one-to-one corresponding to Y2 control resource set(s), and the first control resource set is one control resource set in the first control resource pool other than the Y2 control resource set(s).

In one embodiment, the first transmitter 1203 further transmits a first radio signal, and the first signaling is used for indicating at least one of time-frequency resources occupied by the first radio signal, an MCS employed by the first radio signal or an RV employed by the first radio signal; the first feedback information is used for determining whether the first radio signal is correctly received; the first radio signal is transmitted via the air interface; time-frequency resources occupied by the first radio signal belong to a first data resource set, the first data resource set belongs to a first data resource pool, the Y2 candidate resource set(s) is(are) one-to-one corresponding to Y2 data resource set(s), and the first data resource set is one data resource set in the first data resource pool other than the Y2 data resource set(s).

Embodiment 13

Figure 13:
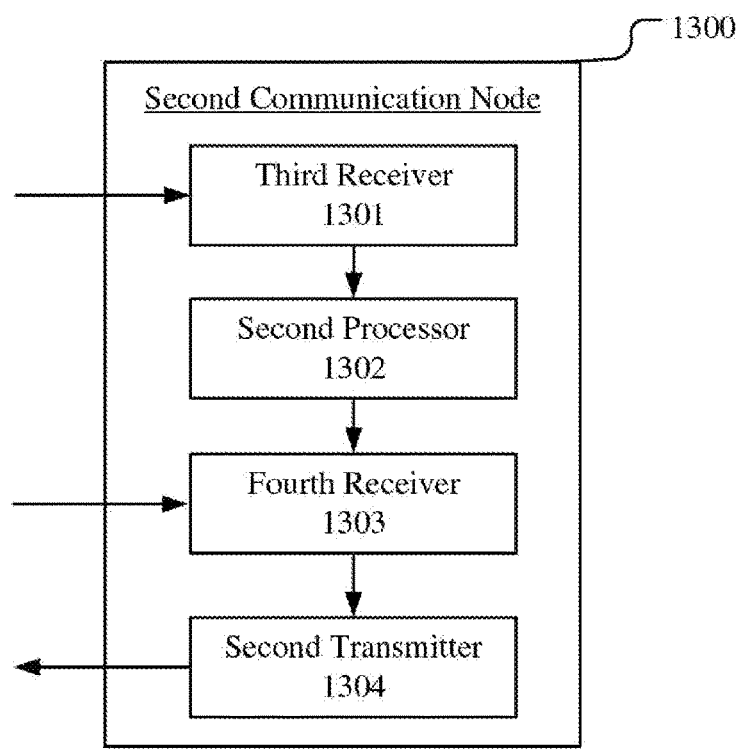
FIG. 13 is a structure block diagram illustrating a processing device in a second communication node according to one embodiment of the disclosure.

Embodiment 13 illustrates an example of a structure block diagram of a processing device in a second communication node, as shown in FIG. 13. In FIG. 13, the processing device 1300 in the second communication node includes a third receiver 1301, a second processor 1302, a fourth receiver 1303 and a second transmitter 1304. The third receiver 1301 includes the transmitter/receiver 456 (including antenna 460), the receiving processor 452 and the controller/processor 490 in FIG. 4 in the disclosure; the second processor 1302 includes the controller/processor 490 in FIG. 4 in the disclosure; the fourth receiver 1303 includes the transmitter/receiver 456 (including antenna 460), the receiving processor 452 and the controller/processor 490 in FIG. 4 in the disclosure; and the second transmitter 1304 includes the transmitter/receiver 456 (including antenna 460), the transmitting processor 455 and the controller/processor 490 in FIG. 4 in the disclosure.

In Embodiment 13, the third receiver 1301 receives X1 signaling(s) in a first time window, the X1 being a positive integer; the second processor 1302 determines Y1 candidate resource set(s) from a first candidate resource pool, the Y1 being a positive integer; the fourth receiver 1303 receives a first signaling; the second transmitter 1304 transmits first feedback information in a target resource set, the target resource set being one of the Y1 candidate resource set(s); the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface.

In one embodiment, the fourth receiver 1303 further receives a first radio signal, wherein the first signaling is used for indicating at least one of time-frequency resources occupied by the first radio signal, an MCS employed by the first radio signal or an RV employed by the first radio signal; the first feedback information is used for determining whether the first radio signal is correctly received; and the first radio signal is transmitted via the air interface.

In one embodiment, the X1 signalings include a second signaling, the second signaling indicates the target resource set, and the X1 signalings indicate X1 integers respectively; an integer among the X1 integers indicated by the second signaling is not greater than any one of the X1 integers, or, an integer among the X1 integers indicated by the second signaling is not less than any one of the X1 integers; the first feedback information is a bundling of a feedback for one radio signal scheduled by the first signaling and a feedback for one radio signal scheduled by the second signaling.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node or UE or terminal in the disclosure includes but not limited to mobile phones, tablet computers, notebooks, network cards, low-power equipment, enhanced MTC (eMTC) terminals, NB-IOT terminals, vehicle-mounted communication equipment, aircrafts, airplanes, unmanned aerial vehicles, telecontrolled aircrafts, and other radio communication equipment. The second node or base station or network side equipment in the disclosure includes but not limited to macro-cellular base stations, micro-cellular base stations, home base stations, relay base stations, eNBs, gNBs, TRPs, relay satellites, satellite base stations, air base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first communication node for wireless communication, comprising:
    a first receiver, to perform signaling monitoring in a first time window, X1 signaling(s) being detected in the signaling monitoring process and the X1 being a non-negative integer;
    a first processor, to determine Y1 candidate resource set(s) from a first candidate resource pool, the Y1 being a positive integer;
    a first transmitter, to transmit a first signaling; and
    a second receiver, to receive first feedback information in a target resource set, the target resource set being one of the Y1 candidate resource set(s);
    wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface; the first candidate resource pool includes a positive integer number of candidate resource sets, and any one candidate resource set in the first candidate resource pool includes bit resources among information bits in a PSFCH.

2. The first communication node according to claim 1, wherein the first candidate resource pool comprises Y candidate resource set(s), any one of the Y1 candidate resource set(s) belongs to one of the Y candidate resource set(s), any one of the Y2 candidate resource set(s) belongs to one of the Y candidate resource set(s), and the Y is an integer not less than a summation of the Y1 and the Y2; and time-frequency resources occupied by the first signaling are used for determining the first candidate resource pool.

3. The first communication node according to claim 1, wherein a time length of a time interval between a start of the first time window and a start of receiving the first feedback information is related to a reference time length; and the reference time length is equal to an upper bound of a time interval length between a start of transmitting the first signaling and a start of receiving the first feedback information; the signaling monitoring includes the monitoring of a signaling of a communication node other than a transmitter of the first feedback information.

4. The first communication node according to claim 1, wherein the X1 is greater than 1, the X1 signalings comprise a second signaling, the second signaling indicates the target resource set, the X1 signalings indicate X1 integers respectively, and an integer among the X1 integers indicated by the second signaling is a first integer; and an integer among the X1 integers other than the first integer is not greater than the first integer, or, an integer among the X1 integers other than the first integer is not less than the first integer.

5. The first communication node according to claim 1, wherein the signaling monitoring is performed only when a time length of the first time window is not less than a first threshold; the first threshold is predefined, or the first threshold is configured; and when the X1 is equal to 0, the Y2 is equal to 0.

6. The first communication node according to claim 1, wherein the first transmitter further transmits a first radio signal, and the first signaling is used for indicating at least one of time-frequency resources occupied by the first radio signal, a Modulation and Coding Scheme (MCS) employed by the first radio signal or a Redundancy Version (RV) employed by the first radio signal; the first feedback information is used for determining whether the first radio signal is correctly received; and the first radio signal is transmitted via the air interface.

7. The first communication node according to claim 1, wherein time-frequency resources occupied by the first signaling belong to a first control resource set, the first control resource set belongs to a first control resource pool, the Y2 candidate resource set(s) is(are) one-to-one corresponding to Y2 control resource set(s), and the first control resource set is one control resource set in the first control resource pool other than the Y2 control resource set(s).

8. The first communication node according to claim 6, wherein time-frequency resources occupied by the first radio signal belong to a first data resource set, the first data resource set belongs to a first data resource pool, the Y2 candidate resource set(s) is(are) one-to-one corresponding to Y2 data resource set(s), and the first data resource set is one data resource set in the first data resource pool other than the Y2 data resource set(s).

9. A second communication node for wireless communication, comprising:
    a third receiver, to receive X1 signaling(s) in a first time window, the X1 being a positive integer;
    a second processor, to determine Y1 candidate resource set(s) from a first candidate resource pool, the Y1 being a positive integer;
    a fourth receiver, to receive a first signaling; and
    a second transmitter, to transmit first feedback information in a target resource set, the target resource set being one of the Y1 candidate resource set(s);
    wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface; the first candidate resource pool includes a positive integer number of candidate resource sets, and any one candidate resource set in the first candidate resource pool includes bit resources among information bits in a PSFCH.

10. The second communication node according to claim 9, wherein the X1 is greater than 1, the X1 signalings comprise a second signaling, the second signaling indicates the target resource set, the X1 signalings indicate X1 integers respectively, and an integer among the X1 integers indicated by the second signaling is a first integer; an integer among the X1 integers other than the first integer is not greater than the first integer, or, an integer among the X1 integers other than the first integer is not less than the first integer; and the first feedback information is a bundling of a feedback for one radio signal scheduled by the first signaling and a feedback for one radio signal scheduled by the second signaling.

11. A method in a first communication node for wireless communication, comprising:
performing signaling monitoring in a first time window, X1 signaling(s) being detected in the signaling monitoring process and the X1 being a non-negative integer;
determining Y1 candidate resource set(s) from a first candidate resource pool, the Y1 being a positive integer;
transmitting a first signaling; and
receiving first feedback information in a target resource set, the target resource set being one of the Y1 candidate resource set(s);
wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface; the first candidate resource pool includes a positive integer number of candidate resource sets, and any one candidate resource set in the first candidate resource pool includes bit resources among information bits in a PSFCH.

12. The method in the first communication node according to claim 11, wherein the first candidate resource pool comprises Y candidate resource set(s), any one of the Y1 candidate resource set(s) belongs to one of the Y candidate resource set(s), any one of the Y2 candidate resource set(s) belongs to one of the Y candidate resource set(s), and the Y is an integer not less than a summation of the Y1 and the Y2; and time-frequency resources occupied by the first signaling are used for determining the first candidate resource pool.

13. The method in the first communication node according to claim 11, wherein a time length of a time interval between a start of the first time window and a start of receiving the first feedback information is related to a reference time length; and the reference time length is equal to an upper bound of a time interval length between a start of transmitting the first signaling and a start of receiving the first feedback information; the signaling monitoring includes the monitoring of a signaling of a communication node other than a transmitter of the first feedback information.

14. The method in the first communication node according to claim 11, wherein the X1 is greater than 1, the X1 signalings comprise a second signaling, the second signaling indicates the target resource set, the X1 signalings indicate X1 integers respectively, and an integer among the X1 integers indicated by the second signaling is a first integer; and an integer among the X1 integers other than the first integer is not greater than the first integer, or, an integer among the X1 integers other than the first integer is not less than the first integer.

15. The method in the first communication node according to claim 11, wherein the signaling monitoring is performed only when a time length of the first time window is not less than a first threshold; the first threshold is predefined, or the first threshold is configured; and when the X1 is equal to 0, the Y2 is equal to 0.

16. The method in the first communication node according to claim 11, further comprising:
transmitting a first radio signal;
wherein the first signaling is used for indicating at least one of time-frequency resources occupied by the first radio signal, an Modulation and Coding Scheme (MCS) employed by the first radio signal or an Redundancy Version (RV) employed by the first radio signal; the first feedback information is used for determining whether the first radio signal is correctly received; and the first radio signal is transmitted via the air interface.

17. The method in the first communication node according to claim 11, wherein time-frequency resources occupied by the first signaling belong to a first control resource set, the first control resource set belongs to a first control resource pool, the Y2 candidate resource set(s) is(are) one-to-one corresponding to Y2 control resource set(s), and the first control resource set is one control resource set in the first control resource pool other than the Y2 control resource set(s).

18. The method in the first communication node according to claim 16, wherein time-frequency resources occupied by the first radio signal belong to a first data resource set, the first data resource set belongs to a first data resource pool, the Y2 candidate resource set(s) is(are) one-to-one corresponding to Y2 data resource set(s), and the first data resource set is one data resource set in the first data resource pool other than the Y2 data resource set(s).

19. A method in a second communication node for wireless communication, comprising:
receiving X1 signaling(s) in a first time window, the X1 being a positive integer;
determining Y1 candidate resource set(s) from a first candidate resource pool, the Y1 being a positive integer;
receiving a first signaling; and
transmitting first feedback information in a target resource set, the target resource set being one of the Y1 candidate resource set(s);
wherein the X1 signaling(s) is(are) used for determining Y2 candidate resource set(s), any one of the Y2 candidate resource set(s) belongs to the first candidate resource pool, any one of the Y1 candidate resource set(s) is one candidate resource set in the first candidate resource pool other than the Y2 candidate resource set(s), and the Y2 is a non-negative integer; the first signaling is used for indicating the target resource set; an end of the first time window is not later than a start of transmitting the first signaling; and the X1 signaling(s), the first signaling and the first feedback information are all transmitted via an air interface; the first candidate resource pool includes a positive integer number of candidate resource sets, and any one candidate resource set in the first candidate resource pool includes bit resources among information bits in a PSFCH.

20. The method in the second communication node according to claim 19, wherein the X1 is greater than 1, the X1 signalings comprise a second signaling, the second signaling indicates the target resource set, the X1 signalings indicate X1 integers respectively, and an integer among the X1 integers indicated by the second signaling is a first integer; an integer among the X1 integers other than the first integer is not greater than the first integer, or, an integer among the X1 integers other than the first integer is not less than the first integer; and the first feedback information is a bundling of a feedback for one radio signal scheduled by the first signaling and a feedback for one radio signal scheduled by the second signaling.

* * * * *